United States Patent [19]
Horvitz et al.

[11] Patent Number: 6,161,130
[45] Date of Patent: Dec. 12, 2000

[54] TECHNIQUE WHICH UTILIZES A PROBABILISTIC CLASSIFIER TO DETECT "JUNK" E-MAIL BY AUTOMATICALLY UPDATING A TRAINING AND RE-TRAINING THE CLASSIFIER BASED ON THE UPDATED TRAINING SET

[75] Inventors: Eric Horvitz, Kirkland; David E. Heckerman, Bellevue; Susan T. Dumais, Kirkland, all of Wash.; Mehran Sahami, Stanford, Calif.; John C. Platt, Bellevue, Wash.

[73] Assignee: Microsoft Corporation, Redmond, Wash.

[21] Appl. No.: 09/102,837

[22] Filed: Jun. 23, 1998

[51] Int. Cl.[7] .......................... G06F 15/16; G06F 15/173; G06F 17/30

[52] U.S. Cl. .......................... 709/206; 709/205; 709/207; 709/240; 707/5; 707/6

[58] Field of Search .................................. 707/5, 6, 205; 709/246, 202, 206, 240, 205, 207; 395/200.01; 347/327

[56] References Cited

U.S. PATENT DOCUMENTS

| | | | |
|---|---|---|---|
| 5,377,354 | 12/1994 | Scannell et al. | 395/650 |
| 5,619,648 | 4/1997 | Canale et al. | 709/206 |
| 5,638,487 | 6/1997 | Chigier | 704/253 |
| 5,835,087 | 11/1998 | Herz et al. | 345/327 |
| 6,003,027 | 12/1999 | Prager | 707/5 |
| 6,023,723 | 2/2000 | McCormick et al. | 709/206 |

FOREIGN PATENT DOCUMENTS

| | | |
|---|---|---|
| 413 537 A2 | 2/1991 | European Pat. Off. . |
| 720 333 A2 | 7/1996 | European Pat. Off. . |
| WO 96/35994 | 11/1996 | WIPO . |

OTHER PUBLICATIONS

U.S. application No. 09/102,946, Dumais et al., filed Jun. 23, 1998.

Y.H. Lin et al, "Classification of Text Documents", Department of Computer Science and Engineering, Michigan State University, E. Lansing, Michigan, *The Computer Journal*, vol. 41, No. 8, 1998.

J. Takkinen et al, "CAFE: A Conceptual Model for Managing Information in Electronic Mail", Laboratory for Intelligent Information Systems, Department of Computer and Information Science, Linköping University, Sweden, Conference on System Sciences, 1998 IEEE.

(List continued on next page.)

*Primary Examiner*—Le Hien Luu
*Assistant Examiner*—Paul Kang
*Attorney, Agent, or Firm*—Michaelson & Wallace; Peter L. Michaelson

[57] ABSTRACT

A technique, specifically a method and apparatus that implements the method, which through a probabilistic classifier (370) and, for a given recipient, detects electronic mail (e-mail) messages, in an incoming message stream, which that recipient is likely to consider "junk". Specifically, the invention discriminates message content for that recipient, through a probabilistic classifier (e.g., a support vector machine) trained on prior content classifications. Through a resulting quantitative probability measure, i.e., an output confidence level, produced by the classifier for each message and subsequently compared against a predefined threshold, that message is classified as either, e.g., spam or legitimate mail, and, e.g., then stored in a corresponding folder (223, 227) for subsequent retrieval by and display to the recipient. Based on the probability measure, the message can alternatively be classified into one of a number of different folders, depicted in a pre-defined visually distinctive manner or simply discarded in its entirety.

65 Claims, 8 Drawing Sheets

OTHER PUBLICATIONS

J. Palme et al, "Issues when designing filters in messaging systems", Department of Computer and Systems Sciences, Stockholm University, Royal Institute of Technology, Skeppargarten 73, S–115 30, Stockholm, Sweden, *Computer Communications*, 1996.

M. Iwayama et al, "Hierarchical Bayesian Clustering for Automatic Text Classification", *Natural Language*, 1995.

Thorsten Joachims, "Text Categorization with Support Vector Machines: Learning with Many Relevant Features", LS–8 Report 23, University of Dortmund, Computer Science Department, Nov. 1997.

Daphne Koller et al., "Hierarchically classifying documents using very few words", In ICML–97: Proceedings of the Fourteenth International Conference on Machine Learning, San Francisco, CA: Morgan Kaufmann, 1997.

Ellen Spertus, "Smokey: Automatic Recognition of Hostile Messages", Proceedings of the Conference on Innovative Applications in Artificial Intelligence (IAAI), 1997.

Hinrich Schutze et al, "A Comparison of Classifiers and Document Representations for the Routing Problem", Proceedings of the $18^{th}$ Annual International ACM SIGIR Conference on Research and Development in Information Retrieval, Seattle, Washington, Jul. 9–13, 1995, pp. 229–237.

Yiming Yang et al, "A Comparative Study on Feature Selection in Text Categorization", School of Computer Science, Carnegie Mellon University, Pittsburgh, PA, and Verity, Inc., Sunnyvale, CA.

Yiming Yang et al, "An Example–Based Mapping Method for Text Categorization and Retrieval", ACM Transactions on Information Systems, vol. 12, No. 3, Jul. 1994, pp. 252–277.

David D. Lewis et al, "A Comparison of Two Learning Algorithms for Text Categorization", Third Annual Symposium on Document Analysis and Information Retrieval, Las Vegas, Nevada, Apr. 11–13, 1994, pp. 81–93.

Mehran Sahami, "Learning Limited Dependence Bayesian Classifiers", In KDD–96: Proceedings of the Second International Conference on Knowledge Discovery and Data Mining, pp. 335–338, Menlo Park, CA: AAAI Press, 1996.

William W. Cohen, "Learning Rules that Classify E–Mail", In the Proceedings of the 1996 AAAI Spring Symposium on Machine Learning in Information Access. Downloaded from William Cohen's web page: http://www.research.att.com//wwcohen/pub.html.

David D. Lewis, "An Evaluation of Phrasal and Clustered Representations on a Text Categorization Task", $15^{th}$ Annual International SIGIR '92, Denmark, 1992, pp. 37–50.

Daphne Koller et al., "Toward Optimal Feature Selection", Machine Learning: Proc. of the Thirteenth International Conference, Morgan Kaufmann, 1996.

David Dolan Lewis, Ph.D., "Representation and learning in information retrieval", University of Massachusetts, 1992.

Tom M. Mitchell, "Machine Learning", Carnegie Mellon University, Bayesian Learning, Chapter 6, pp. 180–184.

PARAMETER GENERATION PROCESS 3100

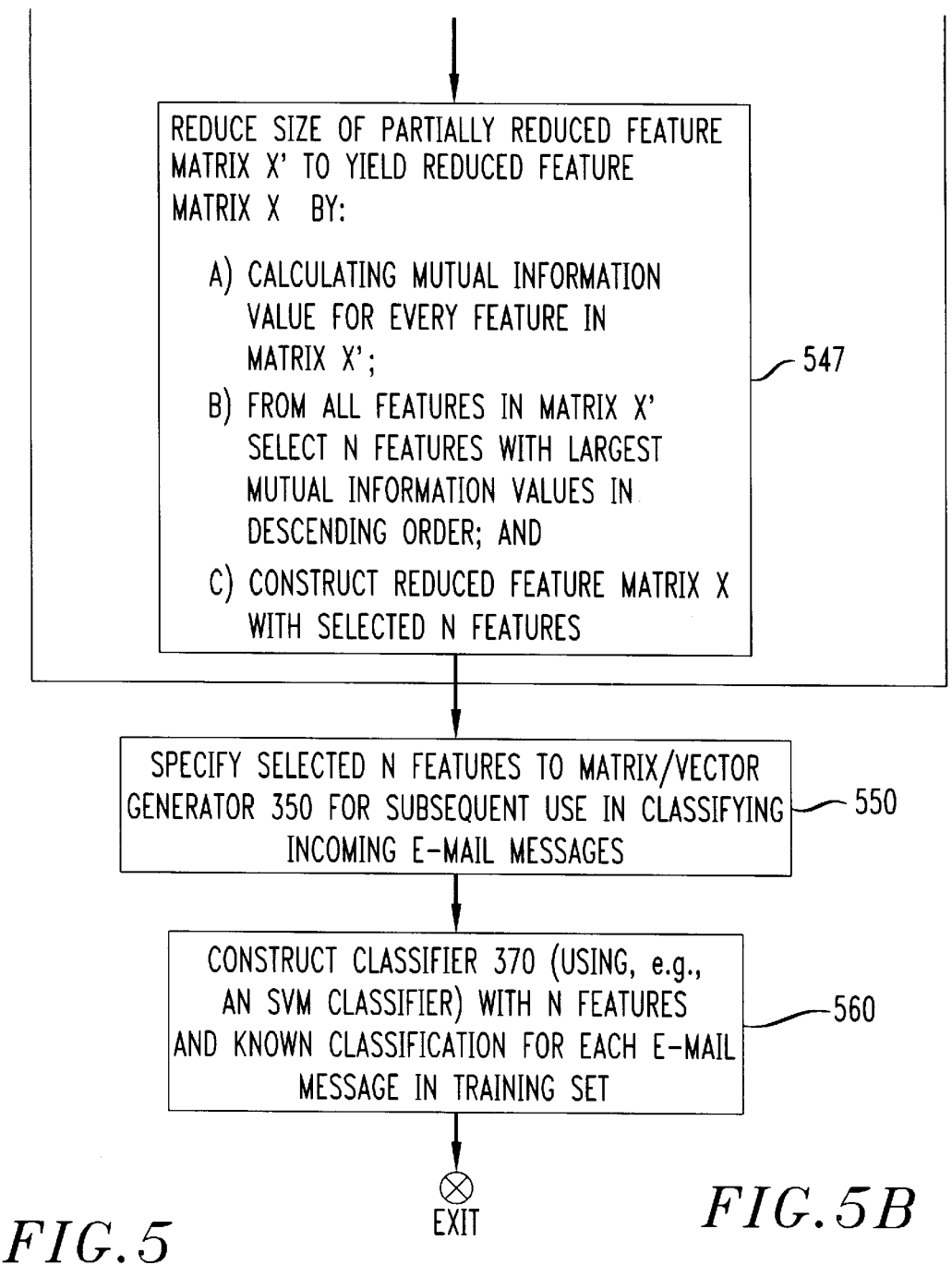

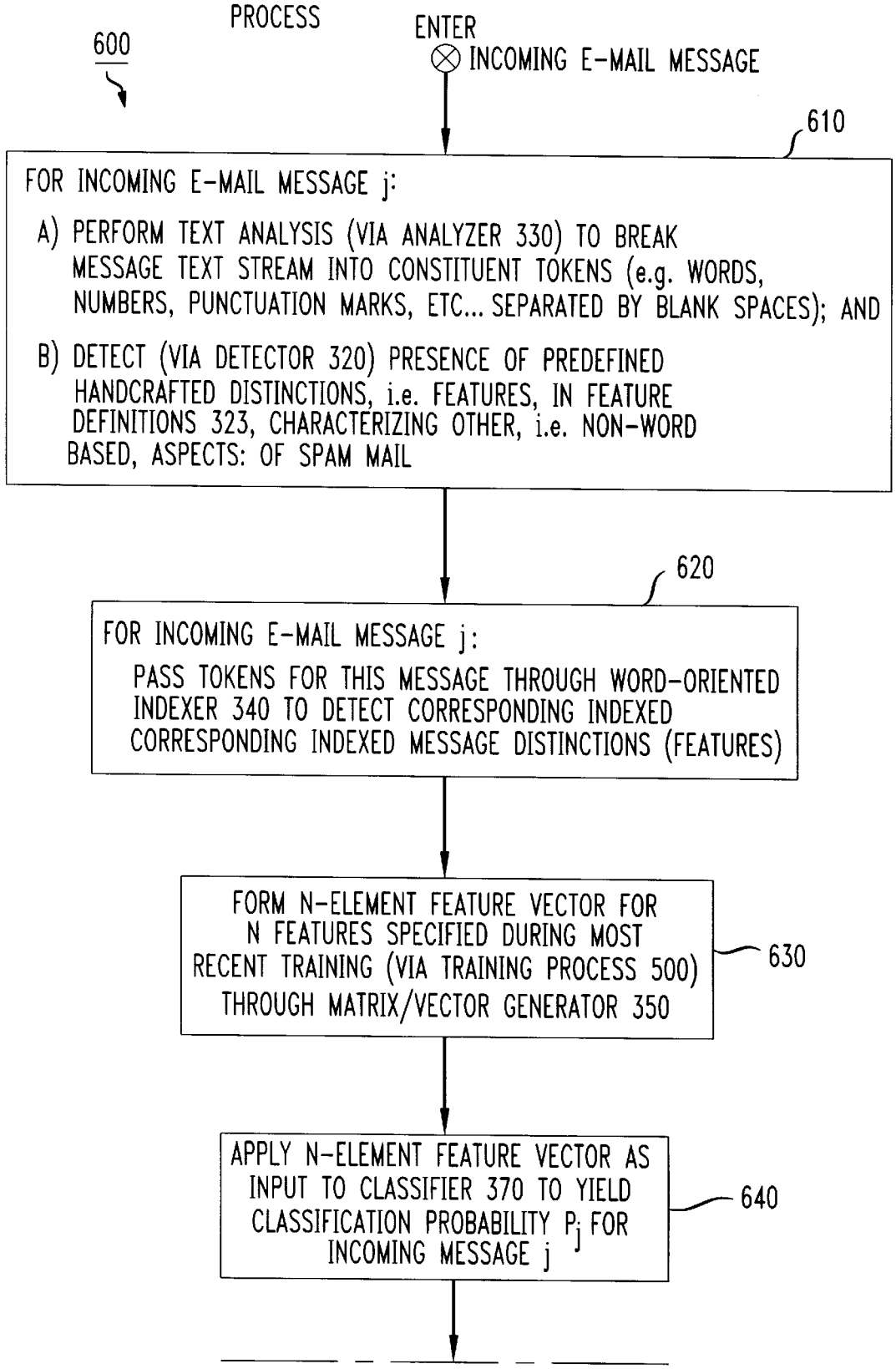

TECHNIQUE WHICH UTILIZES A PROBABILISTIC CLASSIFIER TO DETECT "JUNK" E-MAIL BY AUTOMATICALLY UPDATING A TRAINING AND RE-TRAINING THE CLASSIFIER BASED ON THE UPDATED TRAINING SET

BACKGROUND OF THE DISCLOSURE

1. Field of the Invention

The invention relates to a technique, specifically a method and apparatus that implements the method, which through a probabilistic classifier and, for a given user, detects electronic mail (e-mail) messages which that user is likely to consider "junk". This method is particularly, though not exclusively, suited for use within an e-mail or other electronic messaging application whether used as a stand-alone computer program or integrated as a component into a multi-functional program, such as an operating system.

2. Description of the Prior Art

Electronic messaging, particularly electronic mail ("e-mail") carried over the Internet, is rapidly becoming not only quite pervasive in society but also, given its informality, ease of use and low cost, a preferred method of communication for many individuals and organizations.

Unfortunately, as has occurred with more traditional forms of communication, such as postal mail and telephone, e-mail recipients are increasingly being subjected to unsolicited mass mailings. With the explosion, particularly in the last few years, of Internet-based commerce, a wide and growing variety of electronic merchandisers is repeatedly sending unsolicited mail advertising their products and services to an ever expanding universe of e-mail recipients. Most consumers who order products or otherwise transact with a merchant over the Internet expect to and, in fact, do regularly receive such solicitations from those merchants. However, electronic mailers, as increasingly occurs with postal direct mailers, are continually expanding their distribution lists to penetrate deeper into society in order to reach ever increasing numbers of recipients. In that regard, recipients who, e.g., merely provide their e-mail addresses in response to perhaps innocuous appearing requests for visitor information generated by various web sites, often find, later upon receipt of unsolicited mail and much to their displeasure, that they have been included on electronic distribution lists. This occurs without the knowledge, let alone the assent, of the recipients. Moreover, as with postal direct mail lists, an electronic mailer will often disseminate its distribution list, whether by sale, lease or otherwise, to another such mailer for its use, and so forth with subsequent mailers. Consequently, over time, e-mail recipients often find themselves increasingly barraged by unsolicited mail resulting from separate distribution lists maintained by a wide and increasing variety of mass mailers. Though certain avenues exist, based on mutual cooperation throughout the direct mail industry, through which an individual can request that his(her) name be removed from most direct mail postal lists, no such mechanism exists among electronic mailers.

Once a recipient finds him(her)self on an electronic mailing list, that individual can not readily, if at all, remove his(her) address from it, thus effectively guaranteeing that (s)he will continue to receive unsolicited mail—often in increasing amounts from that and usually other lists as well. This occurs simply because the sender either prevents a recipient of a message from identifying the sender of that message (such as by sending mail through a proxy server) and hence precludes that recipient from contacting the sender in an attempt to be excluded from a distribution list, or simply ignores any request previously received from the recipient to be so excluded.

An individual can easily receive hundreds of pieces of unsolicited postal mail over the course of a year, or less. By contrast, given the extreme ease and insignificant cost through which e-distribution lists can be readily exchanged and e-mail messages disseminated across extremely large numbers of addressees, a single e-mail addressee included on several distribution lists can expect to receive a considerably larger number of unsolicited messages over a much shorter period of time.

Furthermore, while many unsolicited e-mail messages are benign, such as offers for discount office or computer supplies or invitations to attend conferences of one type or another; others, such as pornographic, inflammatory and abusive material, are highly offensive to their recipients. All such unsolicited messages, whether e-mail or postal mail, collectively constitute so-called "junk" mail. To easily differentiate between the two, junk e-mail is commonly known, and will alternatively be referred to herein, as "spam".

Similar to the task of handling junk postal mail, an e-mail recipient must sift through his(her) incoming mail to remove the spam. Unfortunately, the choice of whether a given e-mail message is spam or not is highly dependent on the particular recipient and the actual content of the message. What may be spam to one recipient, may not be so to another. Frequently, an electronic mailer will prepare a message such that its true content is not apparent from its subject line and can only be discerned from reading the body of the message. Hence, the recipient often has the unenviable task of reading through each and every message (s)he receives on any given day, rather than just scanning its subject line, to fully remove all the spam. Needless to say, this can be a laborious, time-consuming task. At the moment, there appears to be no practical alternative.

In an effort to automate the task of detecting abusive newsgroup messages (so-called "flames"), the art teaches an approach of classifying newsgroup messages through a rule-based text classifier. See, E. Spertus "Smokey: Automatic Recognition of Hostile Messages", *Proceedings of the Conference on Innovative Applications in Artificial Intelligence (IAAI)*, 1997. Here, semantic and syntactic textual classification features are first determined by feeding an appropriate corpus of newsgroup messages, as a training set, through a probabilistic decision tree generator. Given handcrafted classifications of each of these messages as being a "flame" or not, the generator delineates specific textual features that, if present or not in a message, can predict whether, as a rule, the message is a flame or not. Those features that correctly predict the nature of the message with a sufficiently high probability are then chosen for subsequent use. Thereafter, to classify an incoming message, each sentence in that message is processed to yield a multi-element (e.g., 47 element) feature vector, with each element simply signifying the presence or absence of a different feature in that sentence. The feature vectors of all sentences in the message are then summed to yield a message feature vector (for the entire message). The message feature vector is then evaluated through corresponding rules produced by the decision tree generator to assess, given a combination and number of features that are present or not in the entire message, whether that message is either a flame or not. For example, as one semantic feature, the author noticed that phrases having the word "you" modified by a certain noun phrases, such as "you people", "you bozos", "you flamers", tend to be insulting. An exception is the phrase "you guys"

which, in use, is rarely insulting. Therefore, one feature is whether any of these former word phrases exist. The associated rule is that, if such a phrase exists, the sentence is insulting and the message is a flame. Another feature is the presence of the word "thank", "please" or phrasal constructs having the word "would" (as in: "Would you be willing to e-mail me your logo") but not the words "no thanks". If any such phrases or words are present (with the exception of "no thanks"), an associated rule, which the author refers to as the "politeness rule" categorizes the message as polite and hence not a flame. With some exceptions, the rules used in this approach are not site-specific, i.e., for the most part they use the same features and operate in the same manner regardless of the addressee being mailed.

A rule based textual e-mail classifier, here specifically one involving learned "keyword-spotting rules", is described in W. W. Cohen, "Learning Rules that Classify E-mail", 1996 *AAAI Spring Symposium on Machine Learning in Information Access,* 1996 (hereinafter the "Cohen" publication). In this approach, a set of e-mail messages previously classified into different categories is provided as input to the system. Rules are then learned from this set in order to classify incoming e-mail messages into the various categories. While this method does involve a learning component that allows for the automatic generation of rules, these rules simply make yes/no distinctions for classification of e-mail messages into different categories without providing any sort of confidence measure for a given prediction. Moreover, in this work, the actual problem of spam detection was not addressed.

Still, at first blush, one skilled in the art might think to use a rule-based classifier to detect spam in an e-mail message stream. Unfortunately, if one were to do so, the result would likely be quite problematic and rather disappointing.

In that regard, rule-based classifiers suffer various serious deficiencies which, in practice, would severely limit their use in spam detection.

First, existing spam detection systems require the user to manually construct appropriate rules to distinguish between legitimate mail and spam. Given the task of doing so, most recipients will not bother to do it. As noted above, an assessment of whether a particular e-mail message is spam or not can be rather subjective with its recipient. What is spam to one recipient may, for another, not be. Furthermore, non-spam mail varies significantly from person to person. Therefore, for a rule based-classifier to exhibit acceptable performance in filtering out most spam from an incoming stream of mail addressed to a given recipient, that recipient must construct and program a set of classification rules that accurately distinguishes between what to him(her) constitutes spam and what constitutes non-spam (legitimate) e-mail. Properly doing so can be an extremely complex, tedious and time-consuming manual task even for a highly experienced and knowledgeable computer user.

Second, the characteristics of spam and non-spam e-mail may change significantly over time; rule-based classifiers are static (unless the user is constantly willing to make changes to the rules). In that regard, mass e-mail senders routinely modify the content of their messages in an continual attempt to prevent, i.e., "outwit", recipients from initially recognizing these messages as spam and then discarding those messages without fully reading them. Thus, unless a recipient is willing to continually construct new rules or update existing rules to track changes, as that recipient perceives, to spam, then, over time, a rule-based classifier becomes increasingly inaccurate, for that recipient, at distinguishing spam from desired (non-spam) e-mail, thereby further diminishing its utility and frustrating its user.

Alternatively, a user might consider using a method for learning rules (as in the Cohen publication) from their existing spam in order to adapt, over time, to changes in their incoming e-mail stream. Here, the problems of a rule-based approach are more clearly highlighted. Rules are based on logical expressions; hence, as noted above, rules simply yield yes/no distinctions regarding the classification for a given e-mail message. Problematically, such rules provide no level of confidence for their predictions. Inasmuch as users may have various tolerances as to how aggressive they would want to filter their e-mail to remove spam, then, in an application such as detecting spam, rule-based classification would become rather problematic. For example, a conservative user may require that the system be very confident that a message is spam before discarding it, whereas another user many not be so cautious. Such varying degrees of user precaution cannot be easily incorporated into a rule-based system such as that described in the Cohen publication.

Therefore, a need exists in the art for a technique that can accurately and automatically detect and classify spam in an incoming stream of e-mail messages and provide a prediction as to its confidence in its classification. Such a technique should adapt itself to track changes, that occur over time, in both spam and non-spam content and subjective user perception of spam. Furthermore, this technique should be relatively simple to use, if not substantially transparent to the user, and eliminate any need for the user to manually construct or update any classification rules or features.

When viewed in a broad sense, use of such a needed technique could likely and advantageously empower the user to individually filter his(her) incoming messages, by their content, as (s)he saw fit—with such filtering adapting over time to salient changes in both the content itself and in subjective user preferences of that content.

SUMMARY OF THE INVENTION

Our inventive technique satisfies these needs and overcomes the deficiencies in the art by discriminating message content for a given recipient, through a probabilistic classifier trained on prior content classifications. Through a resulting quantitative probability measure, i.e., an output confidence level, produced by the classifier for each message, in an incoming message stream, our invention then classifies that message, for its recipient, into one of a plurality of different classes, e.g., either spam (non-legitimate) or legitimate mail. Classifications into subclasses are also possible. For example, the classifier may deem a message to be spam containing information on commercial opportunities, spam containing pornographic material and other adult content, or legitimate e-mail.

In accordance with our specific inventive teachings, each incoming e-mail message, in such a stream, is first analyzed to determine which feature(s) in a set of N predefined features, i.e., distinctions, (where N is an integer), that are particularly characteristic of spam, the message contains. These features (i.e., the "feature set") include both simple-word-based features and handcrafted features. A feature vector, with one element for each feature in the set, is produced for each such message. The contents of the vector are applied as input to a probabilistic classifier, such a modified Support Vector Machine (SVM) classifier, which, based on the features that are present or absent from the message, generates a continuous probabilistic measure as to whether that message is spam or not. This measure is then compared against a preset threshold value. If, for any message, its associated probabilistic measure equals or exceeds the threshold, then this message is classified as spam and, e.g., stored in a spam folder. Conversely, if the probabilistic measure for this message is less than the threshold, then the message is classified as legitimate and hence, e.g., stored in a legitimate mail folder. The contents of the legitimate mail folder are then displayed by a client e-mail program for user selection and review. The contents of the spam folder will only be displayed by the client e-mail program upon a specific user request. The messages in the spam folder can be sorted by increasing probability that the messages are spam, so that the user need only check that the top few messages are indeed spam before deleting all the messages in the folder.

Alternatively, e-mail messages may be classified into multiple categories (subclasses) of spam (e.g., commercial spam, pornographic spam and so forth). In addition, messages may be classified into categories corresponding to different degrees of spam (e.g., "certain spam", "questionable spam", and "non-spam").

Methods other than moving a message identified as spam to a folder can be used to visually distinguish the message from others, or undertake other suitable action based on this classification. For example, the color of a message deemed to be spam can be changed, or the message can be deleted outright. If categories corresponding to different degrees of spam are used, one can use a mixed strategy such as automatically deleting the messages in the "certain spam" folder and moving or highlight the messages in the "questionable spam" folder. Moreover, messages (or portions thereof) can be color coded, using, e.g., different predefined colors in a color gamut, to indicate messages classified into different degrees of legitimacy and/or spam.

Furthermore, the classifier is trained using a training set of m e-mail messages (where m is an integer) that have each been manually classified as either legitimate or spam. In particular, each of these messages is analyzed to determine from a relatively large universe of n possible features (referred to herein as a "feature space"), including both simple-word-based and handcrafted features, just those particular N features (where n and N are both integers, n>N) that are to comprise the feature set for use during subsequent classification. Specifically, a sparse matrix containing the results for all features for the training set is reduced in size through application of, e.g., Zipf's Law and mutual information, to yield a reduced sparse m×N feature matrix. The resulting N features form the feature set are those which will be used during subsequent classification. This matrix and the known classifications for each message in the training set are then collectively applied to the classifier in order to train it.

Advantageously and in accordance with a feature of our invention, should a recipient manually move a message from one folder to another and hence reclassify that message, such as from being legitimate mail into spam, the contents of either or both folders can be fed back as a new training set to re-train and hence update the classifier. Such re-training can occur as a result of each message reclassification; automatically after a certain number of messages have been reclassified; after a given usage interval, such as several weeks or months, has elapsed; or upon user request. In this manner, the behavior of the classifier can advantageously track changing subjective perceptions of spam and preferences of its particular user.

Moreover, as another feature of our invention, the classifier and feature set definitions used by our invention can be readily updated, through a networked connection to a remote server, either manually or on an automatic basis, to account for changes, that occur over time, in the characteristics of spam.

BRIEF DESCRIPTION OF THE DRAWINGS

The teachings of the present invention can be readily understood by considering the following detailed description in conjunction with the accompanying drawings, in which:

FIG. 5 depicts the correct alignment of the drawing sheets for FIGS. 5A and 5B;

FIGS. 5A and 5B collectively depict a high-level flowchart of Feature Selection and Training process 500, that forms a portion of our inventive processing, as shown in FIG. 3A, and is executed within client computer 100 shown in FIG. 4, to select proper discriminatory features of spam and train our inventive classifier to accurately distinguish between legitimate e-mail messages and spam;

FIGS. 6A and 6B collectively depict a high-level flowchart of Classification process 600 that forms a portion of our inventive processing, as shown in FIG. 3A, and is executed by client computer 100, shown in FIG. 4, to classify an incoming e-mail message as either a legitimate message or spam.

To facilitate understanding, identical reference numerals have been used, where possible, to designate identical elements that are common to some of the figures.

DETAILED DESCRIPTION

After considering the following description, those skilled in the art will clearly realize that the teachings of our present invention can be utilized in substantially any e-mail or electronic messaging application to detect messages which a given user is likely to consider, e.g., "junk". Our invention can be readily incorporated into a stand-alone computer program, such as a client e-mail application program, or integrated as a component into a multi-functional program, such as an operating system. Nevertheless, to simplify the following discussion and facilitate reader understanding, we will discuss our present invention in the context of use within a client e-mail program, that executes on a personal computer, to detect spam.

A. Background

Figures 1, 2:
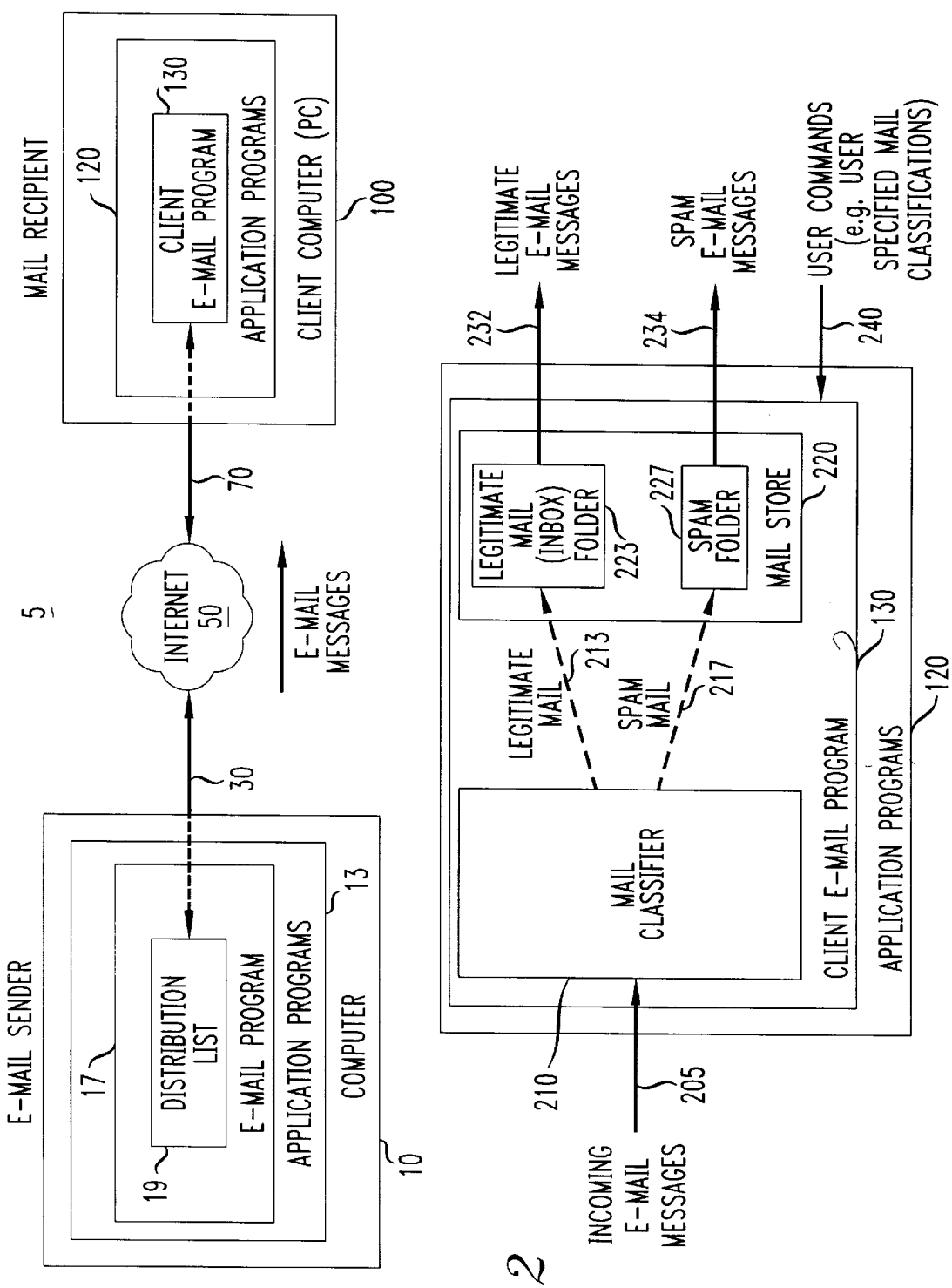
FIG. 1 depicts a high-level block diagram of conventional e-mail connection 5 as would typically be used to carry junk e-mail (spam) from a mass e-mail sender to a recipient.
FIG. 2 depicts a high-level block diagram of client e-mail program 130, that executes within client computer 100 as shown in FIG. 1, which embodies the present invention.

In this context, FIG. 1 depicts a high-level block diagram of e-mail connection 5 as would typically be used to carry junk e-mail (spam) from a mass e-mail sender to a recipient. Specifically, at a remote site, an e-mail sender will first construct or otherwise obtain, in some manner not relevant here, distribution list 19 of e-mail addressees. The sender, typically off-line, will also create, in some fashion also not relevant here, a body of a mass mail message to be sent, on an unsolicited basis, to each of these addressees. Most of these addressees, i.e., recipients, would regard this unsolicited message as "spam" and, hence, useless; each of the remaining addressees might perceive it to be of some interest. Once the message and the distribution list have both been established, the sender will then invoke, as one of application programs 13 residing on computer 10, e-mail program 17. The sender will also establish a network connection, here symbolized by line 30, to a suitable electronic communications network, such as here presumably and illustratively Internet 50, capable of reaching the intended addressees. Once the e-mail program is executing, the sender will then create a new outgoing message using this program, then import a file containing the body of the spam message into the body of the new message, and thereafter import into the e-mail program a file containing distribution list 19 of all the addressees of the new message. Finally, the sender will then simply instruct e-mail program 17 to separately transmit a copy of the new message to each and every addressee on distribution list 19. If the network connection is then operative, each of these messages will be transmitted onto the Internet for carriage to its intended recipient. Alternatively, if the network connection has not yet been established, then e-mail program 17 will queue each of the messages for subsequent transmission onto the Internet whenever the network connection can next be established. Once each message has been transmitted to its recipient by program 17, Internet 50 will then route that message to a mail server (not specifically shown) that services that particular recipient.

In actuality, identical messages may be sent by the sender to thousands of different recipients (if not more). However, for simplicity, we will only show one such recipient. At some point in time, that recipient stationed at client computer 100 will attempt to retrieve his(her) e-mail messages. To do so, that recipient (i.e., a user) will establish networked connection 70 to Internet 50 and execute client e-mail program 130—the latter being one of application programs 120 that resides on this computer. E-mail program 130 will then fetch all the mail for this recipient from an associated mail server (also not specifically shown) connected to Internet 50 that services this recipient. This mail, so fetched, will contain the unsolicited message originally transmitted by the sender. The client e-mail program will download this message, store it within an incoming message folder and ultimately display, in some fashion, the entire contents of that folder. Generally, these messages will first be displayed in some abbreviated manner so the recipient can quickly scan through all of his(her) incoming messages. Specifically, this will usually include, for each such message, its sender (if available), its subject (again if available) and, if a preview mode has been selected, a first few lines of the body of that message itself. If, at this point, the recipient recognizes any of these messages as spam, that person can instruct client e-mail program 130 to discard that particular message. Alternatively, if the recipient is interested in any of these incoming messages, (s)he can select that message, typically by "clicking" on it, whereby the client e-mail program will display the full body of that message. At that point, the recipient can also save the message or discard it. Unless the recipient can identify an incoming message, from just its abbreviated display, as spam, that person will generally open this message, read enough of it to learn its nature and then discard it.

Though spam is becoming pervasive and problematic for many recipients, oftentimes what constitutes spam is subjective with its recipient. Obviously, certain categories of unsolicited message content, such as pornographic, abusive or inflammatory material, will likely offend the vast majority, if not nearly all, of its recipients and hence be widely regarded by them as spam. Other categories of unsolicited content, which are rather benign in nature, such as office equipment promotions or invitations to conferences, will rarely, if ever, offend anyone and may be of interest to and not regarded as spam by a fairly decent number of its recipients.

Conventionally speaking, given the subjective nature of spam, the task of determining whether, for a given recipient, a message situated in an incoming mail folder, is spam or not falls squarely on its recipient. The recipient must read the message, or at least enough of it, to make a decision as to how (s)he perceives the content in the message and then discard the message, as being spam, or not. Knowing this, mass e-mail senders routinely modify their messages over time in order to thwart most of their recipients from quickly classifying these messages as spam, particularly from just their abbreviated display as provided by conventional client e-mail programs; thereby, effectively forcing the recipient to display the full message and read most, if not all, of it. As such and at the moment, e-mail recipients effectively have no control over what incoming messages appear in their incoming mail folder (and are displayed even in an abbreviated fashion). Now, all their incoming mail, as is the case with conventional e-mail client programs (such as program 130 as described thusfar), is simply placed there.

B. Inventive e-mail classifier

1. Overview

Advantageously, our present invention permits an e-mail client program to analyze message content for a given recipient and distinguish, based on that content and for that recipient, between spam and legitimate (non-spam) messages and so classify each incoming e-mail message for that recipient.

In that regard, FIG. 2 depicts a high-level block diagram of a client e-mail program 130 that executes within client computer 100 as shown in FIG. 1 and which has been modified to incorporate the present invention.

In essence and as shown, program 130 has been modified, in accordance with our inventive teachings, to include mail classifier 210 and illustratively, within mail store 220, separate legitimate mail folder 223 and spam mail folder 227. Incoming e-mail messages are applied, as symbolized by lead 205, to an input of mail classifier 210, which, in turn, probabilistically classifies each of these messages as either legitimate or spam. Based on its classification, each message is routed to either of folders 223 or 227, as symbolized by dashed lines 213 and 217, for legitimate mail and spam, respectively. Alternatively, messages can be marked with an indication of a likelihood (probability) that the message is spam; messages assigned intermediate probabilities of spam can be moved, based on that likelihood, to an intermediate folder or one of a number of such folders that a user can review; and/or messages assigned a high probability of being spam can be deleted outright and in their entirety. To enhance reader understanding and to simplify the following discussion, we will specifically describe our invention from this point onward in the context of two folder (spam and legitimate e-mail) classification. In that context, the contents of each of folders 223 and 227 are available for display, as symbolized by lines 232 and 234 for legitimate mail and spam, respectively. The contents of legitimate mail folder 223 are generally displayed automatically for user review and selection; while the contents of spam folder 227 are displayed upon a specific request from the user. In addition, the user can supply manual commands, as symbolized by line 240, to e-mail client program 130 to, among other things, move a particular mail message stored in one of the folders, e.g., in legitimate mail folder 223, into the other folder, e.g., in spam folder 227, and thus manually change the classification of that message. In addition, the user can manually instruct program 130 to delete any message from either of these folders.

In particular and in accordance with our specific inventive teachings, each incoming e-mail message, in a message stream, is first analyzed to assess which one(s) of a set of predefined features, that are particularly characteristic of spam, the message contains. These features (i.e., the "feature set") include both simple-word-based features and handcrafted features, the latter including, e.g., special multi-word phrases and various features in e-mail messages such as non-word distinctions. Generally speaking, these non-word distinctions collectively relate to, e.g., formatting, authoring, delivery and/or communication attributes that, when present in a message, tend to be indicative of spam, i.e., they are domain-specific characteristics of spam. Illustratively, formatting attributes may include whether a predefined word in the text of a message is capitalized, or whether that text contains a series of predefined punctuation marks. Delivery attributes may illustratively include whether a message contains an address of a single recipient or addresses of a plurality of recipients, or a time at which that message was transmitted (most spam is sent at night). Authoring attributes may include, e.g., whether a message comes from a particular e-mail address. Communication attributes can illustratively include whether a message has an attachment (a span message rarely has an attachment), or whether the message was sent by a sender having a particular domain type (most spam appears to originate from ".com" or ".net" domain types). Handcrafted features can also include tokens or phrases known to be, e.g., abusive, pornographic or insulting; or certain punctuation marks or groupings, such as repeated exclamation points or numbers, that are each likely to appear in spam. The specific handcrafted features are typically determined through human judgment alone or combined with an empirical analysis of distinguishing attributes of spam messages.

A feature vector, with one element for each feature in the set, is produced for each incoming e-mail message. That element simply stores a binary value specifying whether the corresponding feature is present or not in that message. The vector can be stored in a sparse format (e.g., a list of the positive features only). The contents of the vector are applied as input to a probabilistic classifier, preferably a modified support vector machine (SVM) classifier, which, based on the features that are present or absent from the message, generates a probabilistic measure as to whether that message is spam or not. This measure is then compared against a preset threshold value. If, for any message, its associated probabilistic measure equals or exceeds the threshold, then this message is classified as spam and, e.g., stored in a spam folder. Alternatively, if the probabilistic measure for this message is less than the threshold, then the message is classified as legitimate and hence, e.g., stored in a legitimate mail folder. The classification of each message is also stored as a separate field in the vector for that message. The contents of the legitimate mail folder are then displayed by the client e-mail program for user selection and review. The contents of the spam folder will only be displayed by the client e-mail program upon a specific user request.

Furthermore, the classifier is trained using a set of m e-mail messages (i.e., a "training set", where m is an integer) that have each been manually classified as either legitimate or spam. In particular, each of these messages is analyzed to determine from a relatively large universe of n possible features (referred to herein as a "feature space"), including both simple-word-based and handcrafted features, just those particular N features (where n and N are both integers, n>N) that are to comprise the feature set for use during subsequent classification. Specifically, a matrix, typically sparse, containing the results for all n features for the training set is reduced in size through application of Zipf's Law and mutual information, both as discussed in detail below to the extent necessary, to yield a reduced N-by-m feature matrix. The resulting N features form the feature set that will be used during subsequent classification. This matrix and the known classifications for each message in the training set are then collectively applied to the classifier in order to train it.

Advantageously, should a recipient manually move a message from one folder to another and hence reclassify it, such as from being legitimate into spam, the contents of either or both folders can be fed back as a new training set to re-train and hence update the classifier. Such re-training can occur as a result of each message reclassification; automatically after a certain number of messages have been reclassified; after a given usage interval, such as several weeks or months, has elapsed; or upon user request. In this manner, the behavior of the classifier can advantageously track changing subjective perceptions and preferences of its particular user.

Moreover, to simplify user operation, the user can alternatively obtain software modules for an updated classifier and feature set definitions by simply downloading, via a remote server accessible through, e.g., an Internet connection, appropriate program and data modules from a software manufacturer. As such, the user can obtain, such as on an ongoing subscription or single-copy basis, replacement software modules that have been modified by the manufacturer to account for the latest changes in spam characteristics—thereby relieving the user of any need to keep abreast of and react to any such changes.

This replacement can occur on user demand and/or on an automatic basis, totally transparent to the user, such as, e.g., once every few weeks or months. Advantageously, through automatic replacement, the client e-mail program could periodically establish, on its own scheduled basis (or as modified by a user), a network connection to and establish a session with a remote server computer. Through that session, the client program can automatically determine whether a software manufacturer has posted, for downloading from the server, a later version of these modules than that presently being used by this particular client e-mail program. In the event a later version then exists, the client program can retrieve appropriate file(s), such as through an "ftp" (file transfer protocol) transfer, for this version along with, if appropriate, an applicable installation applet. Once the retrieval successfully completes, the client e-mail program can execute the applet or its own internal updating module to automatically replace the existing modules with those for the latest version. Proceeding in this manner will permit the client e-mail program, that incorporates our present invention, to reflect the latest spam characteristics and use those characteristics to accurately filter incoming mail, without requiring user intervention to do so.

Figure 3A:
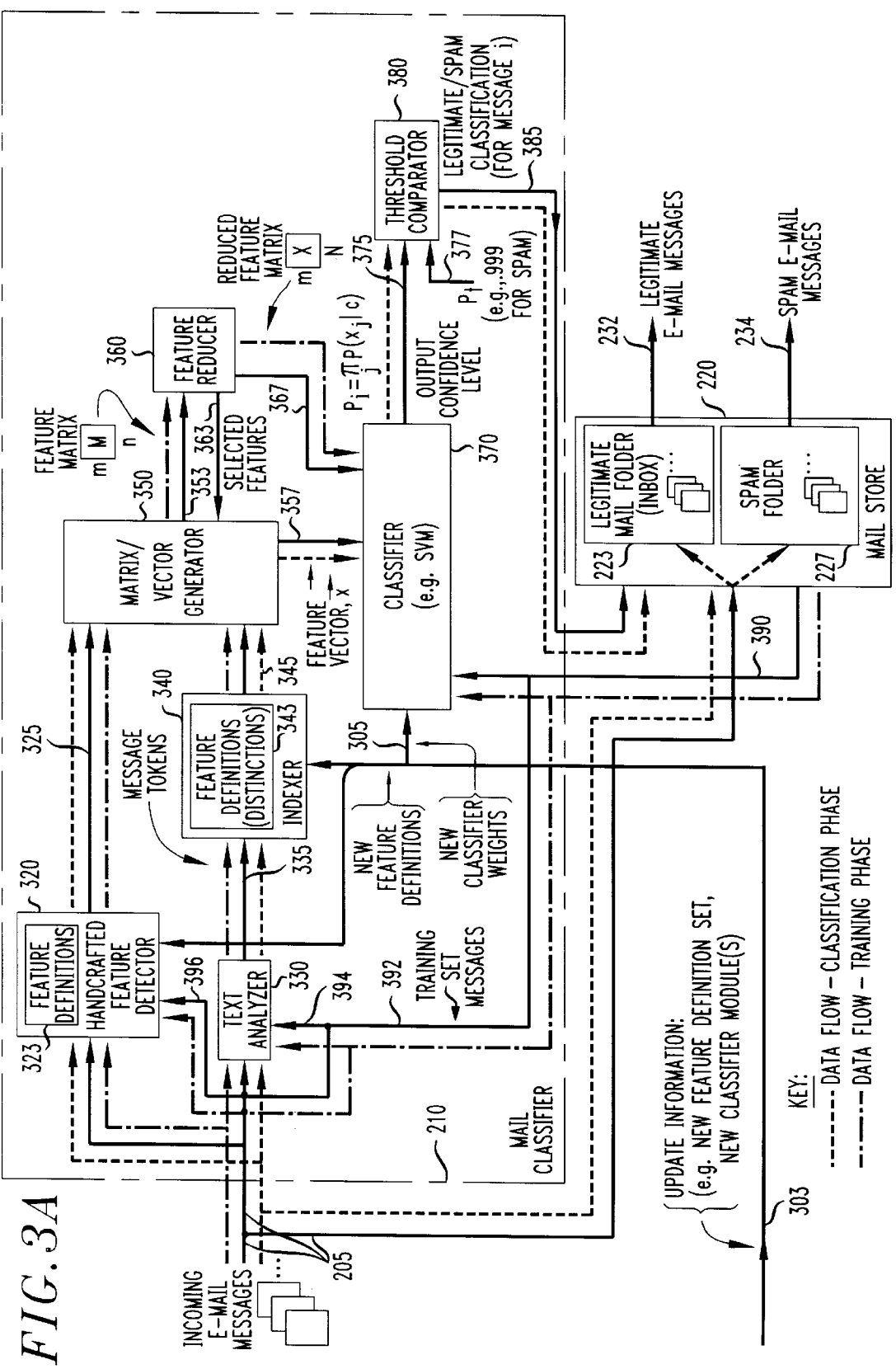
FIG. 3A depicts a high-level functional block diagram of various software modules, and their interaction, which are collectively used in implementing an embodiment of our present invention.

With the above in mind, FIG. 3A depicts a high-level functional block diagram of various software modules, and their interaction, which are collectively used in implementing one embodiment of our present invention. As shown, these modules, which include a classifier, collectively implement two basic phases of our inventive processing: (a) training the classifier using a set of training e-mail messages with known classifications ("training" phase), and (b) classifying incoming messages ("classification" phase). We will now separately discuss our inventive message processing in the context of each of these two phases from which the functionality of all the modules will be clear. To simplify understanding, the figure separately shows the data flow for each of these two phases, with as indicated in a key: long-short dashed lines for the data flow associated with the training phase, and even-length dashed lines for the data flow associated with the classification phase.

As shown, the software modules utilized in this embodiment of our invention include: mail classifier 210 that itself contains: handcrafted feature detector 320, text analyzer 330, indexer 340, matrix/vector generator 350, feature reducer 360, classifier 370 and threshold comparator 380; and mail store 220.

In essence, during the training phase, a set of m training messages (m being a predefined integer) with known classifications (i.e., as either spam or legitimate mail) is used to train classifier 370. To do so, each of these messages is first analyzed to detect the presence of every one of n individual features in the feature space so as to form a feature matrix. The feature matrix is then reduced in size, with a resulting reduced feature matrix being applied as input to the classifier. The known classifications of the training messages are also applied to the classifier. Thereafter, the classifier constructs an internal model. Once this model is fully constructed, training is complete; hence, the training phase terminates.

Specifically, each of the m e-mail training messages (also being an "input" message) is applied, as input and as symbolized by lines 205, to both handcrafted feature detector 320 and text analyzer 330. These messages can originate from a source external to classifier 210 or, as discussed below, from mail store 220.

Handcrafted feature detector 320 detects whether that input message contains each feature in a group of predefined features and, by so doing, generates a binary yes/no result for each such feature. These particular features, as specified within feature definitions 323 associated with detector 320 and generally described above, collectively represent handcrafted domain-specific characteristics of spam.

Text analyzer 330 breaks each input message into its constituent tokens. A token is any textual component, such as a word, letter, internal punctuation mark or the like, that is separated from another such component by a blank (white) space or leading (following) punctuation mark. Syntactic phrases and normalized representations for times and dates are also extracted by the text analysis module. Analyzer 330 directs, as symbolized by line 335, a list of the resulting tokens, simply in an order of their appearance in the input message, as input to indexer 340. Indexer 340, being a word-oriented indexer such as Microsoft Index Server program (which is currently available from Microsoft Corporation of Redmond, Wash.), builds an index structure noting the simple-word-based features contained in each document. Here, too, the indexer generates a simple binary yes/no result for each such word-oriented feature. Alternatively, the indexer can generate an n-ary feature for each simple-word-based feature. For example, a simple-word-based feature may have as its state "not present in message", "present only once", and "present more than once". Each of these particular simple-word-based features, as specified within feature definitions 343 associated with indexer 340, defines a word. Collectively, all the features that are defined within feature definitions 323 and 343 form an n-element feature space (where n is an integer which equals a total cumulative number of the handcrafted and simple-word-based features). The detected features produced by detector 320 and indexer 340 are routed, as symbolized by respective lines 325 and 345, to inputs of matrix/vector generator 350. During the training phase, this generator produces a sparse n-by-m feature matrix (where m is a number of messages in a training set) M for the entire training set of m training messages. The n-by-m entry of this matrix indicates whether the $n^{th}$ feature is present in the $m^{th}$ training message. Inasmuch as the matrix is sparse, zeroes (feature absent) are not explicitly stored in the matrix. Though the functionality of generator 350 could be readily incorporated into collectively detector 320 and indexer 340, for ease of understanding, we have shown this generator as a separate module.

Generator 350 supplies the sparse n-by-m feature matrix, M, as symbolized by line 353 as input to feature reducer 360. Through application of Zipf's Law and the use of mutual information—both of which are discussed below, reducer 360 reduces the size of the feature matrix to a sparse N-by-m reduced feature matrix X (where N is an integer less than n, and illustratively equal to 500). In particular, the feature reducer first reduces the size of the feature matrix by eliminating all those features that appear k or less times (where k is a predefined integer equal to, e.g., one). Thereafter, reducer 360 determines a measure of mutual information for each of the resulting features. To then form the reduced feature matrix, X, feature reducer 360 then selects, from all the remaining features rank ordered in descending order of their corresponding mutual information measures, N highest ranked features. These N features collectively define a "feature set" which is subsequently used during message classification. Once the specific features in the feature set are determined, then, as symbolized by line 363, reducer 360 specifies these particular features to matrix/vector generator 350, which, during the classification phase, will generate an N-element feature vector, x, that contains data for only the N-element feature set, for each subsequent incoming e-mail message that is to be classified.

The resulting sparse reduced feature matrix, X, produced by reducer 360 is applied, as symbolized by line 367, as input to classifier 370.

For training, data values for each message in the training set occupy a separate row in the reduced feature matrix. Only one row of feature set data in the matrix, i.e., that for a corresponding training message, is applied to the classifier at a time. In addition, a corresponding known classification of that particular training message is applied, as symbolized by, e.g., line 390, from mail store 220 (assuming that the training messages are stored within the mail store—as is usually the case) to the classifier coincidentally with the associated feature set data. The feature set data and the known classification value for all the training messages collectively form "training data". In response to the training data, classifier 370 constructs an internal model (not specifically shown in FIG. 3A). Once the model is fully constructed using all the training data, training is complete; hence, the training phase then terminates. The classification phase can then begin.

In essence, during the classification phase, each incoming e-mail message is quantitatively classified, through classifier 370, to yield an output confidence level which specifies a probability (likelihood) that this particular message is spam. As noted above, this likelihood can be used to drive several alternative user-interface conventions employed to allow review and manipulation of spam. For a binary folder threshold-based approach to displaying and manipulating the spam probability assignment, the message is designated as either spam or legitimate e-mail, based on the magnitude of the assigned probability of spam, and then illustratively stored in either spam folder 227 or legitimate mail folder 223, respectively, for later retrieval. To do so, each incoming message is first analyzed but only to detect the presence of every individual handcrafted and word-oriented feature in the N-element feature set, thereby resulting in an N-element feature vector for that message. This vector is applied as input to the classifier. In response, the classifier produces an output confidence level, i.e., a classification probability (likelihood), for that particular message. The value of this probability is compared against a fixed threshold value. Depending upon whether the probability equals or exceeds, or is less than the threshold, the message is classified as either spam or legitimate mail and is then stored in the corresponding mail folder.

Specifically, an incoming e-mail message to be classified, is applied (as an input message), as symbolized by lines 205, to both handcrafted feature detector 320 and text analyzer 330. Detector 320, in the same manner described above, detects whether that input message contains each handcrafted feature and, by so doing, generates a binary yes/no result for each such feature. In the same fashion as described above, text analyzer 330 breaks that input message into its constituent tokens. Analyzer 330 directs, as symbolized by line 335, a list of the resulting tokens, simply in an order of their appearance in the input message, as input to indexer 340. Indexer 340, identically to that described above, detects whether the list of tokens for the input message contains each one of the predefined simple-word-based features and so generates a binary yes/no result for that feature. The detected results, for the n-element feature set, produced by detector 320 and indexer 340 are routed, as symbolized by respective lines 325 and 345, to inputs of matrix/vector generator 350. During the classification phase, as contrasted with the training phase, generator 350 selects, from the results for the n-element feature set, those results for the particular N features determined during the most recent training phase and then constructs an N-element feature vector, $\vec{x}$, for the incoming message. This feature vector can also be stored sparsely. The data for this feature vector is then applied, as symbolized by line 357, as input to classifier 370.

Given this vector, classifier 370 then generates an associated quantitative output confidence level, specifically a classification probability, that this particular message is spam. This classification probability is applied, as symbolized by line 375, to one input of threshold comparator 380. This comparator compares this probability for the input message against a predetermined threshold probability, illustratively 0.999, associated with spam. If the classification probability is greater than or equal to the threshold, then the input message is designated as spam; if the classification probability is less than the threshold, then this input message is designated as legitimate mail. Accordingly, the results of the comparison are applied, as symbolized by line 385, to mail store 220 to select a specific folder into which this input message is then to be stored. This same message is also applied, as symbolized by line 205 and in the form received, to an input of mail store 220 (this operation can be implemented by simply accessing this message from a common mail input buffer or mail queue). Based on the results of the comparison, if this message is designated as legitimate mail or spam, it is then stored, by mail store 220, into either folder 223 or 227, respectively. The legitimate mail and spam can be rank ordered within their respective folders 223 or 227 in terms of their corresponding output confidence levels. In this regard, e.g., the legitimate mail could be ordered in legitimate mail folder 223 in terms of their ascending corresponding confidence levels (with the messages having the lowest confidence levels being viewed by the classifier as "most" legitimate and hence being displayed to a recipient at a top of a displayed list, followed by messages so viewed as having increasingly less "legitimacy"). Furthermore, not only can these messages be rank ordered but additionally or alternatively the messages themselves (or portions thereof) or a certain visual identifier(s) for each such message can be color coded. Specific colors or a range of colors could be used to designate increasing levels of legitimacy. In this case, a continuous range (gamut) of colors could be appropriately scaled to match a range that occurs in the output confidence level for all the legitimate messages. Alternatively, certain predefined portions of the range in the output confidence level could be assigned to denote certain classes of "legitimacy". For example, a red identifier (or other color that is highly conspicuous) could be assigned to a group of mail messages that is viewed by the classifier as being the most legitimate. Such color-coding or rank ordering could also be incorporated as a user-controlled option within the client e-mail program such that the user could customize the graphical depiction and arrangement of his (her) mail, as desired. Furthermore, such color coding can also be used to denote certain categories of spam, e.g., "certain spam", "questionable spam" and so forth. Alternatively, other actions could occur, such as outright deletion of a message, based on its classification probability, e.g., if that probability exceeds a sufficiently high value.

Figure 3B:
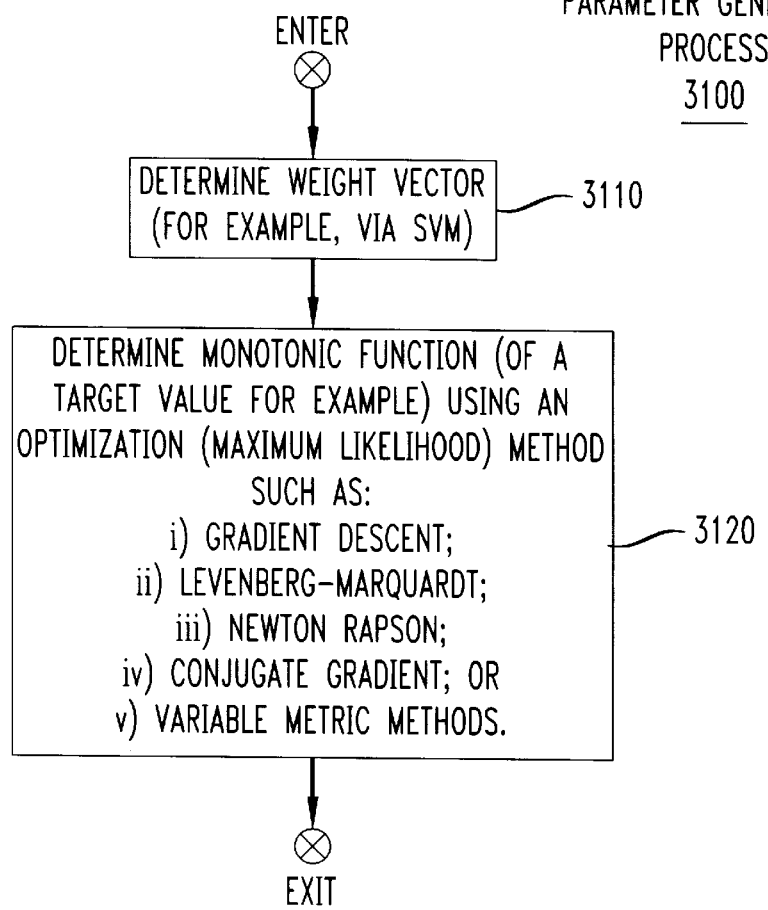
FIG. 3B depicts a flowchart of high-level generalized process 3100 for generating parameters for a classification engine.

Advantageously, should a recipient manually move a message from one folder to another within mail store 220 and hence reclassify that message, such as from being legitimate into spam, the contents of either or both folders can be accessed and fed back, as symbolized by line 390, as a new training set to re-train and hence update classifier 370. Such re-training can occur as a result of each message reclassification; manually upon user request, such as through an incoming user command appearing on line 240 (see FIG. 2); automatically after, e.g., either a certain number of messages have been reclassified, or simply after a given usage interval, such as several weeks or months, has elapsed. In this manner, the behavior of classifier 370 (shown in FIG. 3) can advantageously track changing subjective perceptions and preferences of its user.

As noted above, the user could alternatively obtain, as symbolized by line 303, updated software modules for classifier 370 and feature set definitions 323 and 343 by downloading corresponding files, via a remote server accessible through, e.g., an Internet connection, and thereafter having these files appropriately installed into the client e-mail program—effectively overwriting the existing files for these modules.

Alternatively, in lieu of obtaining replacement software modules for the classifier and feature definitions, classifier 370 could be modified to include appropriate software-based modules that, given a training set of mail messages and known classifications, searches for appropriate distinguishing message features in that set. One these features are found, they can be stored in features definitions 323 and 343, as appropriate. However, since detecting such features, particularly in a relatively large training set, is likely to be processor intensive, doing so is not favored for client-side implementation.

Classifier 370 can be implemented using a number of different techniques. In that regard, classifier 370 can be implemented through, e.g., a support vector machine (SVM) as will be discussed in detail below, a Naive Bayesian classifier, a limited dependence Bayesian classifier, a Bayesian network classifier, a decision tree, content matching, neural networks, or any other statistical or probabilistic-based classification technique. In addition, classifier 370 can be implemented with multiple classifiers. Specifically, with multiple classifiers, each such classifier can utilize a different one of these classification techniques with an appropriate mechanism also being used to combine, arbitrate and/or select among the results of each of the classifiers to generate an appropriate output confidence level. Furthermore, all these classifiers can be the same but with, through "boosting", their outputs weighted differently to form the output confidence level. Moreover, with multiple classifiers, one of these classifiers could also feed its probabilistic classification output, as a single input, to another of these classifiers.

2. SVM Classifier 370

We have empirically found that classifier 370 can be effectively implemented using a modified linear SVM. Basically, the classifier will classify a message having a reduced feature vector x, based on equation (1) as follows:

$$p(\text{spam}) = f(\vec{w} \cdot \vec{x}) \qquad (1)$$

where: f(z) a monotonic (e.g., sigmoid) function of z;

p is a probability;

$\vec{w}$ is a weight vector; and

• represents a dot product.

Hence, classifier 370 has a weight vector parameter and a monotonic function having adjustable parameters, both of which are determined in the manner described below. The reader should now refer to FIG. 3B which depicts a high-level flowchart of generalized process 3100 for generating parameters for a classification engine. As shown, first the weight vector $\vec{w}$ is determined through step 3110, then the monotonic function (and its adjustable parameters) is determined through step 3120, after which the process terminates. Both of these steps will now be described in considerable detail.

a. Weight Vector Determination (Step 3110)

The weight vector parameter may be generated by methods used to train a support vector machine.

Conventionally speaking, an SVM may be trained with known objects having known classifications to define a hyperplane, or hypersurface, which separates points in n-dimensional feature vector space into those which are in a desired class and those which are not. A pair of adjustable parameters, $\vec{w}$ (a "weight vector") and b (a "threshold") can be defined such that all of the training data, X, having a known classification y, satisfy the following constraints as set forth in equations (2) and (3) below:

$$\vec{x}_i \cdot \vec{w} + b \geq +1 \text{ for } y_i = +1 \qquad (2)$$

$$\vec{x}_i \cdot \vec{w} + b \leq -1 \text{ for } y_i = -1 \qquad (3)$$

where: i=1, . . . , number of training examples;

$\vec{x}_i$ is the $i^{th}$ input vector;

$\vec{w}$ is a weight vector;

b is a threshold parameter; and $y_i$ is a known classification associated with the $i^{th}$ training example and is +1 if the example is "in the (desired) class" and −1 if the training example is "not in the class".

For classifier 370, the concept "in the class" may refer either to legitimate e-mail or to spam. Either is correct, provided the definition remains consistent throughout the training procedure. The inequality conditions of equations (2) and (3) can be combined into the following inequality condition, as given by equation (4) below, by multiplying each side of the equations by y and +1 or −1, and subtracting 1 from both sides:

$$y_i(\vec{x}_i \cdot \vec{w} + b) - 1 \geq 0 \qquad (4)$$

The points for which the equality of equation (2) hold lie on the hyperplane $\vec{x}_i \cdot \vec{w} + b = 1$, with normal $\vec{w}$, and perpendicular distance to the origin $(1-b)/\|\vec{w}\|$, where $\|\vec{w}\|$ is the Euclidean norm of the vector $\vec{w}$. Similarly, the points for which the equality of equation (3) hold lie on the hyperplane $\vec{x}_i \cdot \vec{w} + b = -1$, with perpendicular distance to the origin $(-1-b)/\|\vec{w}\|$. Here, a margin can be calculated as the sum of both of the distances, namely $2/\|\vec{w}\|$. By minimizing $\|\vec{w}\|^2$, subject to the constraints of equation (4), the hyperplane providing a maximum margin can therefore be determined.

Thus, training an SVM presents a constrained optimization (e.g., minimization) problem. That is, a function is minimized (referred to as an "objective function") subject to one or more constraints. Although those skilled in the art are familiar with methods for solving constrained optimization problems (see, e.g., pages 195–224 of Fletcher, *Practical Methods of Optimization*, 2$^{nd}$ ed. (© 1987, John Wiley & Sons), which is incorporated by reference herein), relevant methods will be introduced below for the reader's convenience.

A point on an objective function that satisfies all constraints is referred to as a "feasible point" and is located in a "feasible region". A constrained optimization problem is solved by a feasible point having no feasible descent directions. Thus, methods for solving constrained minimization problems are often iterative so that a sequence of values converges to a local minimum.

Those skilled in the art recognize that Lagrange multipliers provide a way to transform equality-constrained optimization problems into unconstrained extremization problems. Lagrange multipliers ($\alpha$) may be used to find an extreme value of a function f(x) subject to a constraint g(x), such that $0 = \nabla f(x) + \alpha \nabla g(x)$, where $\nabla$ is a gradient function. Thus, if $f(w) = \|\vec{w}\|^2$ and $g(w) = y_i(\vec{x}_i \cdot \vec{w} + b) - 1$, then the Lagrangian, as given by equation (5) below, results:

$$L_p = \frac{1}{2}\|\vec{w}\|^2 - \sum_{i=1}^{nte} \alpha_i y_i(\vec{x}_i \cdot \vec{w} + b) + \sum_{i=1}^{nte} \alpha_i \qquad (5)$$

where: "nte" is a number of training examples.

The widely known concept of "duality" allows provision of an alternative formulation of a mathematical programming problem which is, for example, computationally convenient. Minimizing equation (5) subject to the constraint that a must be non-negative is referred to as a "primal" (or original) problem. The "dual" (i.e., the transformed) problem maximizes equation (5) subject to the constraints that the gradient of $L_p$ with respect to $\vec{w}$ and b vanishes and that α must be non-negative. This transformation is known as the "Wolfe dual". The dual constraints can be expressed as given by equations (6) and (7) below:

$$\vec{w} = \sum_i \alpha_i y_i \vec{x}_i \qquad (6)$$

$$\sum_i \alpha_i y_i = 0 \qquad (7)$$

Substituting the conditions of equations (6) and (7) into equation (5) yields the following Lagrangian as given by equation (8) below:

$$L_D = \sum_{i=1}^{nte} \alpha_i - \frac{1}{2} \sum_{i,j=1}^{nte} \alpha_i \alpha_j y_i y_j \vec{x}_i \cdot \vec{x}_j \qquad (8)$$

The solution to this dual quadratic programming problem can be determined by maximizing the Lagrangian dual problem $L_D$.

The support vector machine can therefore be trained by solving the dual Lagrangian quadratic programming problem. There is a Lagrange multiplier $\alpha_i$ for each example i of a training set. The points for which $\alpha_i$ is greater than zero are the "support vectors". These support vectors are the critical elements of the training set since they lie closest to the decision boundary and therefore define the margin from the decision boundary.

Unfortunately, the quadratic programming problem of equation (8) merely represents the optimization problem with constraints in a more manageable form than do the problems of equations (2) and (3). Numerical methods, such as constrained conjugate gradient ascent, projection methods, Bunch-Kaufman decomposition, and interior points methods, may be used to solve the quadratic problem. Suffice to say that these numerical methods are not trivial, particularly when there are a large number of examples i in the training set. Referring to equation (8), solving the quadratic problem involves an "nte" by "nte" matrix (where "nte" is the number of examples in the training set).

A relatively fast way to determine the weight vector is disclosed in co-pending U.S. patent application Ser. No. 09/055,477, filed on Apr. 6, 1998, by John Platt and entitled "Methods and Apparatus for Building a Support Vector Machine Classifier" (hereinafter the "Platt" application, which is also owned by a common assignee hereof), which is incorporated by reference herein. For ease of reference, the methods that are described in the Platt application for determining the weight vector will be referred to hereinafter as the "Platt" methods with these methods being distinguished by the order in which they are presented (e.g., first, second and so forth) in that application. Inasmuch as having a non-zero threshold is advantageous in detecting spam, then the second Platt method, i.e., "QP2", which is also described below, is preferred for creating classifier 370.

Specifically, in accordance with the second Platt method ("QP2"), the quadratic programming process is subject to a linear equality constraint (i.e., threshold b is not necessarily equal to zero).

As to this method itself, the Lagrange multipliers, corresponding to each of examples of the training set, are first initialized. Since most of the Lagrange multipliers may be zero, all of the Lagrange multipliers may be initialized by setting them equal to zero. For each training example from the set of training examples, we determine whether a Kuhn-Tucker condition is violated. If such a Kuhn-Tucker condition is violated, another example is selected from the training set (as will be discussed below), thereby creating a pair of Lagrange multipliers to be jointly optimized. An attempt is made to determine new Lagrange multipliers such that the examples are jointly optimized. It is then determined whether the examples were indeed optimized. If they were not optimized, another feature vector is selected from the training set thereby creating another pair of Lagrange multipliers.

The first step in the joint optimization of the two Lagrange multipliers is to determine the bounds on one of the variables. Either the first or the second multiplier can be bounded; here, the second is chosen. Let L be a lower bound on the second Lagrange multiplier and H be a higher bound on the second Lagrange multiplier. Let $y_1$ be the desired output of the first example and let $y_2$ be the desired output of the second example. Let $\alpha_1$ be the current value of the first Lagrange multiplier and $\alpha_2$ be the current value of the second Lagrange multiplier. If $y_1$ is the same as $y_2$, then the following bounds, as given by equations (9), are computed:

$$H=\min(C,\alpha_1+\alpha_2) \quad L=\max(0,\alpha_1+\alpha_2-C) \qquad (9)$$

If $y_1$ is the opposite sign as $y_2$, then the bounds are computed as given by equations (10), as follows:

$$H=\min(C,C-\alpha_1+\alpha_2) \quad L=\max(0,\alpha_2-\alpha_1) \qquad (10)$$

If the value L is the same as the value H, then no progress can be made; hence, the training examples were not optimized.

The new optimized value of $\alpha_2$, i.e., $\alpha^{new}_2$, may be computed via equation (11) as follows:

$$\alpha_2^{new} = \alpha_2 + \frac{y_2(u_1 - y_1 + y_2 - u_2)}{k(\vec{x}_1,\vec{x}_1) + k(\vec{x}_2,\vec{x}_2) - 2k(\vec{x}_1,\vec{x}_2)} \qquad (11)$$

where: $u_i$ is the output of the SVM on the $i^{th}$ training example ($\vec{w} \cdot \vec{x}_i - b$); and k is a kernel function, which here is a dot product between the two arguments of k.

If the new value of the second Lagrange multiplier is less than L, then it is set to L. Conversely, if the new value of the second Lagrange multiplier is greater than H, then it is set to H. If a new clipped (or limited) value of the second Lagrange multiplier, i.e., $\alpha^{new\ clipped}_2$, is the same as the old value, then no optimization is possible; hence, the training examples were not optimized. Otherwise, the new value of the first Lagrange multiplier, i.e., $\alpha^{new}_1$, is then derived from the clipped (or limited) value of the second Lagrange multiplier through equation (12) as follows:

$$\alpha_1^{new} = \alpha_1 + y_1 y_2 (\alpha_2 - \alpha_2^{new.clipped}) \qquad (12)$$

If the support vector machine is linear, then the weights and thresholds are updated to reflect the new Lagrange multipliers so that other violations of the Kuhn-Tucker conditions can be detected.

The second Lagrange multiplier pair may be selected based on the following heuristic. The ideal second Lagrange multiplier would change the most upon joint optimization. An easy approximation to the change upon optimization is the absolute value of a numerator in the change in the second Lagrange multiplier, as given by equation (13):

$$|(u_1-y_1)-(u_2-y_2)| \qquad (13)$$

If true error $(u_1-y_1)$ of the first Lagrange multiplier is positive, then a second Lagrange multiplier that has a large negative true error $(u_2-y_2)$ would be a good candidate for joint optimization. If the first true error is negative, then a second Lagrange multiplier that has a large positive true error would be a good candidate for optimization. Therefore, the second Platt method seeks out a non-boundary Lagrange multiplier ($\alpha \neq 0$ or C) that has a true error that is the most opposite of the true error of the first Lagrange multiplier.

There are some degenerate cases where different examples have the same input feature vectors. This could prevent the joint optimization from progressing. These redundant examples could be filtered out. Alternatively, a hierarchy of heuristics may be used to find a second example to make forward progress on the joint optimization step. If the first heuristic described above fails, the second Platt method will select a non-boundary Lagrange multiplier as the other Lagrange multiplier of the pair to be jointly optimized. If this heuristic fails for all non-boundary Lagrange multipliers, any of the other Lagrange multipliers may be selected as the other Lagrange multiplier of the pair.

Once the sweep through the set of training examples is complete, if one or more Lagrange multipliers changed with the sweep through an entire data set, the non-boundary Lagrange multipliers are then optimized. If, on the other hand, no Lagrange multipliers changed during the sweep, then all of the examples obey the Kuhn-Tucker conditions and the second Platt method is terminated.

Thus, as can be appreciated, the second Platt method first sweeps through all training examples of the training set. Assuming that a Lagrange multiplier was changed, the next sweep processes only the non-boundary training examples of the training set. Subsequent sweeps also process only the non-boundary Lagrange multipliers until no Lagrange multipliers change. Then, the next sweep processes the entire set of training examples. If no Lagrange multipliers change, processing ends. If, on the other hand, a Lagrange multiplier changes, the processing continues as discussed above. Naturally, in an alternative methodology, all training examples of the training set could be processed on every sweep.

The Lagrange multipliers can be stored either as a single array having a size corresponding to the number of training examples (also referred to as a "full array") or as two arrays that collectively represent a larger sparse array.

The real error used for jointly optimizing a pair of Lagrange multipliers is the desired output of the SVM less the actual output of the SVM (i.e., $y_i - u_i$). These real errors may be cached for the examples that have a non-boundary (e.g., non-zero) Lagrange multiplier. Caching the real errors allows a second example to be intelligently chosen.

For classifier 370, the linear SVM may be stored as one weight vector, rather than as a linear superpositions of a set of input points. If the input vector is sparse, the update to the weight vector can also be accomplished in a known sparse manner.

Thus, the weight vector $\vec{w}$ for classifier 370 can be determined by training an SVM using the second Platt method. Other methods of training SVMs (e.g., Chunking, Osuna's method) are known in the art and may alternatively be used to create this classifier.

b. Monotonic Function Determination (step 3120)

Figure 3C:
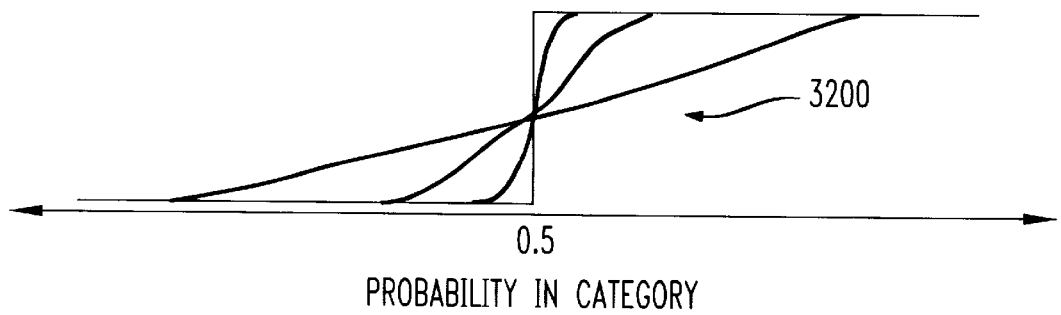
FIG. 3C depicts various illustrative sigmoid functions 3200.

As discussed above, the text classifier employs a monotonic (e.g., sigmoid) function to classify textual information objects. FIG. 3C shows various illustrative sigmoid functions 3200. A sigmoid function may be expressed in the form given by equation (14) as follows:

$$f(u) = \frac{1}{1+e^u} \qquad (14)$$

The characteristics of the sigmoid function may be adjusted using constants A and B (also referred to as "adjustable parameters") such that, as given by equation (15) below:

$$f(u) = \frac{1}{1+e^{Au+B}} \qquad (15)$$

Techniques for solving for A and B of the monotonic function will now be described.

(i) Optimization (Maximum Likelihood)

The constants A and B may be determined by using a maximum likelihood on the set of training examples of textual information objects. In order to fit the sigmoid to the training data, we compute the logarithm of the likelihood that the training targets y were generated by the probability distribution f, assuming independence between training examples. The log likelihood is described by equation (16) as follows:

$$\sum_{i=1}^{nte} y_i \log(f(\vec{x}_i)) + (1-y_i)\log(1-f(\vec{x}_i)) \qquad (16)$$

where: $y_i$ is a known result (+1 or −1); and
nte is the number of training examples.

The optimal sigmoid parameters are then derived by maximizing the log likelihood over possible sigmoid parameters.

(a) Known Optimization Methods

Expression (16) may be maximized based on conventional and widely known unconstrained optimization techniques such as, e.g., gradient descent, Levenberg-Marquart, Newton Raphson, conjugate gradient, and variable metric methods. We will now discuss one such technique.

(1) Laplace's Rule of Succession

In equation (16) above, the $y_i$ values may be replaced by target values $t_i$, which may be expressed as given by equations (17) as follows:

$$t_i = \begin{cases} \dfrac{N_+ + 1}{N_+ + 2} & \text{if } y = +1 \\ 1 - \dfrac{N_- + 1}{N_- + 2} & \text{if } y = -1 \end{cases} \qquad (17)$$

where: $N_+$ is the number of textual information objects of the training set in the class; and
$N_-$ is the number of textual information objects of the training set not in the class.

By using the target values ti rather than $y_i$, the resulting sigmoid function is no more precise than the data used to determine it. That is, the sigmoid function is not "overfit" to past data, particularly in categories with little training data. In this way, a sigmoid function is determined that matches unknown data given a prior that all probabilities are equally likely. Although the use of the target function $t_i$ of equation (18) is presented below in the context of creating classifier 370, it is applicable to other classifiers as well. Naturally, other target functions, which depend on the number of training examples in the positive and negative classes, could be used instead of the target function defined in equations (17).

In one technique of fitting a sigmoid to the training data, the target values ($tt_i$), expressed as shown in equations (18) as follows, are used:

$$tt_i = \begin{cases} \max(t_i, 0.99) & \text{if } y_i = +1 \\ \min(t_i, 0.01) & \text{if } y_i = -1 \end{cases} \quad (18)$$

This version of the target function limits the effect of Laplace's rule of succession to be no farther away than 0.01 from the true target y. We have empirically found this result to be desirable.

3. Hardware

Figure 4:
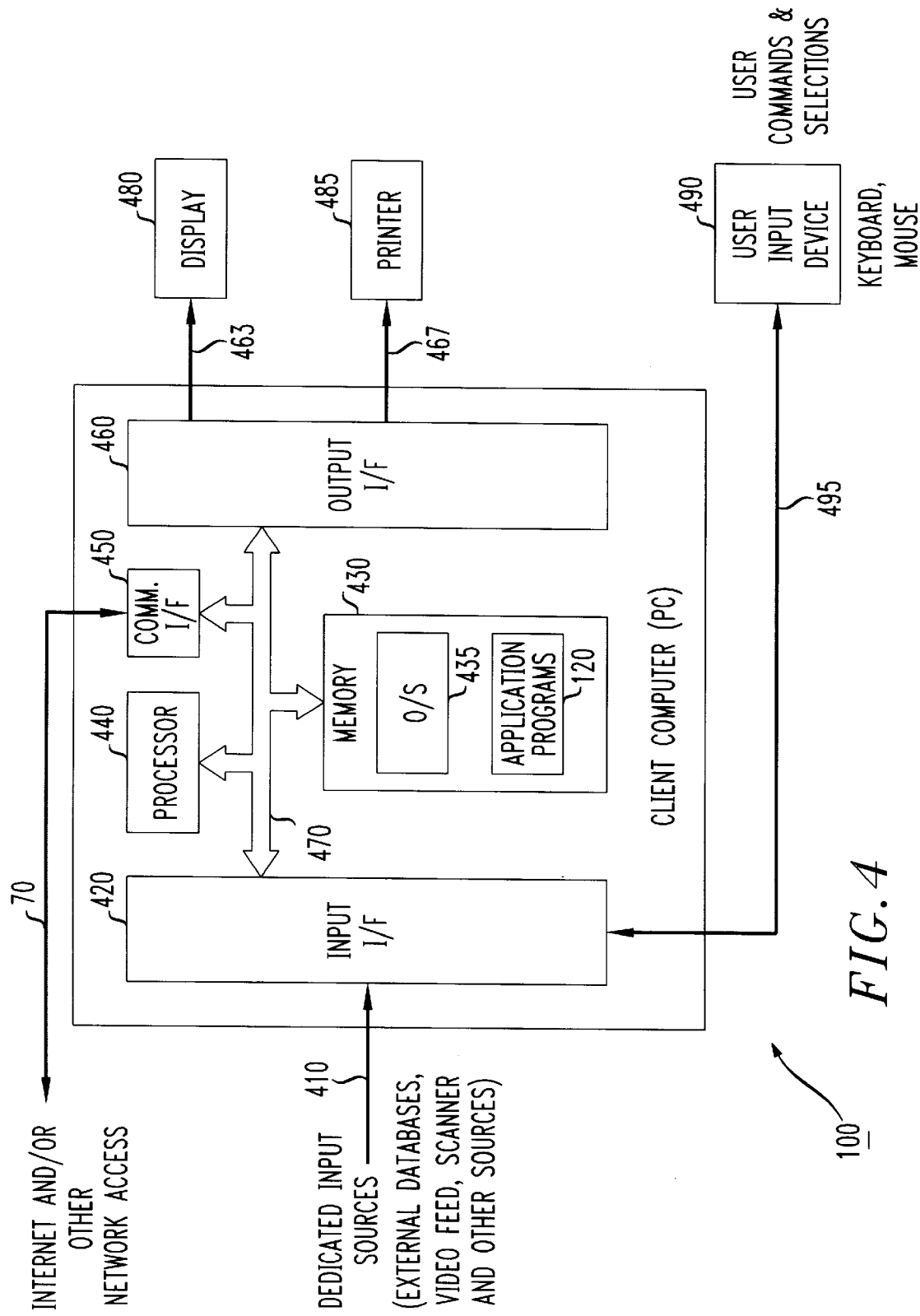
FIG. 4 depicts a high-level block diagram of client computer (PC) 100 that implements the embodiment of our present invention shown in FIG. 3A.

FIG. 4 depicts a high-level block diagram of client computer (PC) 100 on which our present invention can be implemented.

As shown, computer system 100 comprises input interfaces (I/F) 420, processor 440, communications interface 450, memory 430 and output interfaces 460, all conventionally interconnected by bus 470. Memory 430, which generally includes different modalities (all of which are not specifically shown for simplicity), illustratively random access memory (RAM) and hard disk storage, stores operating system (O/S) 435 and application programs 120 (which includes those modules shown in FIG. 3A). Where our invention is incorporated within a client e-mail program—as in the context of the present discussion, the specific software modules that implement our invention would be incorporated within application programs 120 and particularly within client e-mail program 130 therein (see FIG. 2). O/S 435, shown in FIG. 4, may be implemented by any conventional operating system, such as the WINDOWS NT operating system (WINDOWS NT being a registered trademark of Microsoft Corporation of Redmond, Wash.). Given that, we will not discuss any components of O/S 435 as they are all irrelevant. Suffice it to say, that the client e-mail program, being one of application programs 120, executes under control of O/S 435.

Advantageously and as discussed above, our present invention, when embedded for use within a client e-mail program, particularly with automatic updating of software modules for the classifier and the feature set definitions, can function and be maintained in a manner that is substantially, if not totally, transparent to the user. Computer 100 accomplishes this by establishing, either manually on demand by the user or preferably on a date and time scheduled basis, through network connection 70, a network connection with a remote server that stores files provided by the software manufacturer. Through an ftp transfer and subsequent automatic execution of a software installation applet or a local updating module, as discussed above, processor 440 will replace appropriate software modules used by the client e-mail program situated within application programs 120 with their correspondingly later versions.

As shown in FIG. 4, incoming information can generally arise from two illustrative external sources: network supplied information, e.g., from the Internet and/or other networked facility (such as an intranet), through network connection 70 to communications interface 450, or from a dedicated input source, via path(es) 410, to input interfaces 420. On the one hand, e-mail messages and appropriate software modules, for updating as discussed above, will be carried over network connection 70. Dedicated input, on the other hand, can originate from a wide variety of sources, e.g., an external database, a video feed, a scanner or other input source. Input interfaces 420 are connected to path(es) 410 and contain appropriate circuitry to provide the necessary and corresponding electrical connections required to physically connect and interface each differing dedicated source of input information to computer system 100. Under control of the operating system, application programs 120 exchange commands and data with the external sources, via network connection 70 or path(es) 410, to transmit and receive information typically requested by a user during program execution.

Input interfaces 420 also electrically connect and interface user input device 490, such as a keyboard and mouse, to computer system 100. Display 480, such as a conventional color monitor, and printer 485, such as a conventional laser printer, are connected, via leads 463 and 467, respectively, to output interfaces 460. The output interfaces provide requisite circuitry to electrically connect and interface the display and printer to the computer system. Through these input and output devices, a given recipient can instruct client computer 100 to display the contents of, e.g., his(her) legitimate mail folder on display 480, and, upon appropriate manual selection through user input device 490, any particular message in its entirety contained in that folder. In addition, through suitably manipulating user input device 490, such as by dragging and dropping a desired message as shown on the display from one icon or displayed folder to another, that recipient can manually move that message between these folders, as described above, and thus change its classification as stored within an associated feature vector residing within memory 430.

Furthermore, since the specific hardware components of computer system 100 as well as all aspects of the software stored within memory 430, apart from the specific modules that implement the present invention, are conventional and well-known, they will not be discussed in any further detail.

4. Software

To facilitate understanding, the reader should simultaneously refer to both FIG. 3A and, as appropriate, either FIGS. 5A and 5B, or 6A and 6B throughout the following discussion.

Figure 5A:
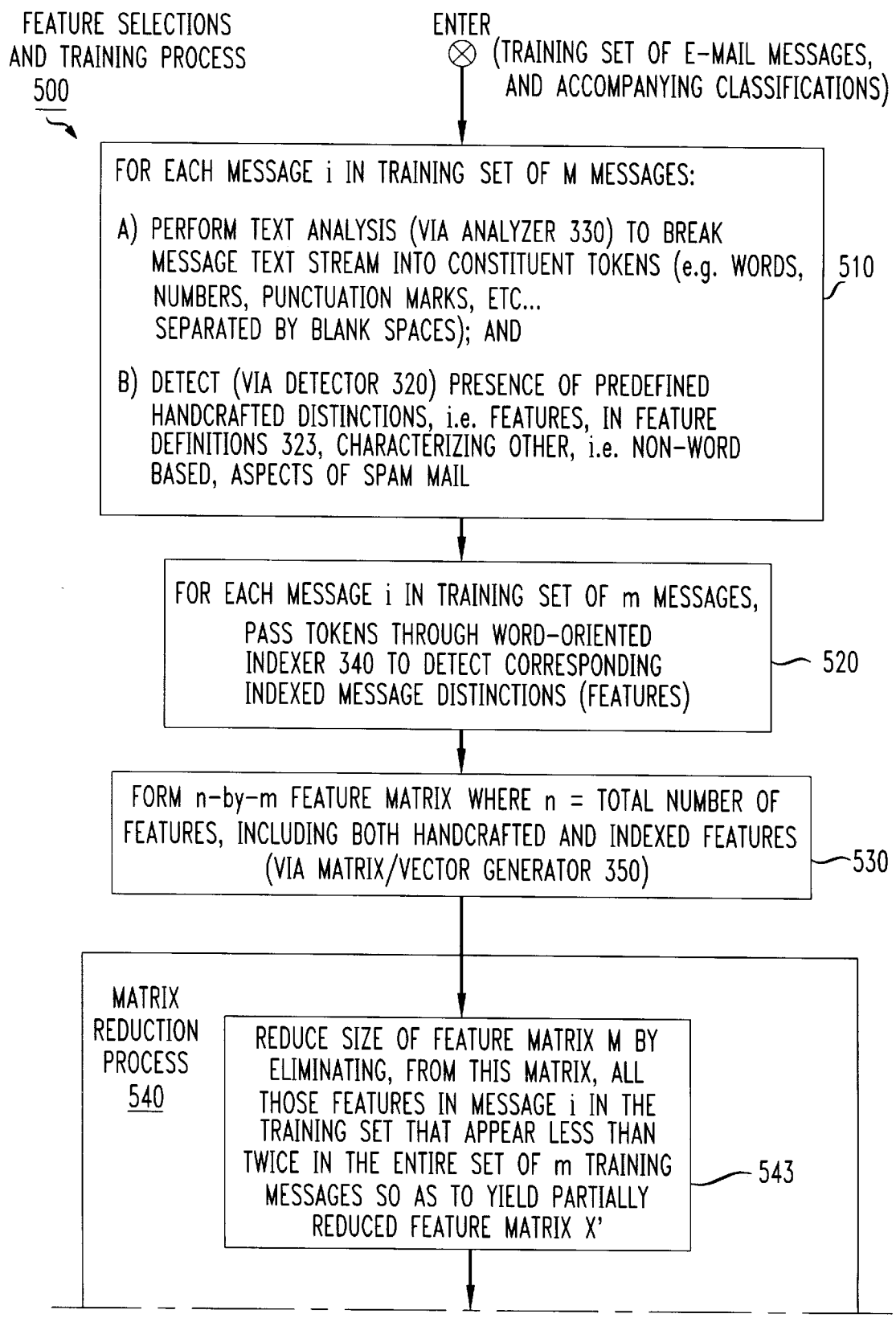

FIGS. 5A and 5B collectively depict a high-level flowchart of Feature Selection and Training process 500, that forms a portion of our inventive processing, as shown in FIG. 3A (the implementing software for this process, which forms a portion of inventive client e-mail program 130 shown in FIG. 2, is stored as executable instructions and, as appropriate, data in memory 430 shown in FIG. 4), and is executed within client computer 100, to select proper discriminatory features of spam and train our inventive classifier to accurately distinguish between legitimate e-mail messages and spam. The correct alignment of the drawing sheets for FIGS. 5A and 5B is shown in FIG. 5.

As shown in FIGS. 5A and 5B, upon entry into process 500, execution first proceeds to block 510. This block, when executed, provides initial processing of each message i in the m-message training set. In particular, for each such message i, block 510 analyzes the text of that message through text analyzer 330 in order to break that message into its constituent tokens, as noted above, and also detects, through handcrafted feature detector 320, the presence of each predefined handcrafted feature in the message. Once this occurs, execution next proceeds to block 520. This block passes the word-based tokens for each message i in the training set through word-oriented indexer 340 to detect the presence of each of the predefined simple-word-based (i.e., indexed) features, specified in feature definitions 323, in that message. Thereafter, execution proceeds to block 530. This block, when executed, constructs, through matrix/vector generator 350, the n-by-m feature matrix, M, where each row of the matrix, as noted above, contains a feature vector for a message in the training set. Once this matrix is fully constructed, execution proceeds to matrix reduction process 540. This process, collectively implemented through feature reducer 360, reduces the size of the feature matrix to N common features for each message in the training set so as to yield an N-by-m reduced feature matrix, X.

In particular, process 540 reduces the size of the feature matrix, M, through two phases, via execution of blocks 543 and 547. First, block 543 executes to reduce the matrix through application of Zipf's Law. This law, which is well known in the art, is directed to distribution of different words in text. It effectively states that, given a number of words that appear exactly once in the text, half that number will appear twice, a third of that number will appear three times, and so forth evidencing an exponential decline in word count with increasing frequency. Consequently, many of the words in the text will appear infrequently (e.g., only once, as previously discussed). Given this, we assume that any simple-word-based or handcrafted feature which appears infrequently in an entire training set of mail messages is generally not sufficiently distinctive, in and of itself, of spam. Therefore, block 543 discards all those features from the feature space which appear infrequently in favor of retaining those features, in the training set, that exhibit any repetition. Partially reduced feature matrix X' results. Once block 543 completes its execution, block 547 then executes to select N particular features, i.e., forming a feature set, from the partially reduced feature matrix. Specifically, to do so, block 547 first calculates mutual information for each feature that appears in matrix X'. Mutual information is a measure of an extent to which a feature, f, is associated with a class, c, in this case spam. By choosing features that exhibit high mutual information measures, these features will serve as good discriminators of spam.

Mutual information, MI, for an occurrence of feature f and class c, is generally defined by equation (19) below:

$$MI(c, f) = \sum_{c,f} \left( p(c, f) \log \frac{p(c, f)}{p(c)p(f)} \right) \quad (19)$$

Here, illustratively, the class variable c takes on values +1 (in the class spam) and −1 (not in the class spam). A feature f also takes on the values +1 (feature present) and −1 (feature absent). Expanding the summation gives, as shown in equation (20):

$$MI(c, f) = P(f^+c^+) \log \left( \frac{P(f^+c^+)}{P(f^+)P(c^+)} \right) + \quad (20)$$
$$P(f^+c^-) \log \left( \frac{P(f^+c^-)}{P(f^+)P(c^-)} \right) +$$
$$P(f^-c^+) \log \left( \frac{P(f^-c^+)}{P(f^-)P(c^+)} \right) +$$
$$P(f^-c^-) \log \left( \frac{P(f^-c^-)}{P(f^-)P(c^-)} \right)$$

where: $P(f^+)$ is the probability that a message has feature f;
$P(f^-)$ is the probability that a message does not have the feature f;
$P(c^+)$ is the probability that a message belongs to class c;
$P(c^-)$ is the probability that a message does not belong to class c;
$P(f^+c^+)$ is the probability that a message has feature f and belongs to class c;
$P(f^-c^+)$ is the probability that a message does not have feature f, but belongs to class c;
$P(f^+c^-)$ is the probability that a message has feature f, but does not belong to class c; and
$P(f^-c^-)$ is the probability that a message does not have feature f and does not belong to class c.

Each message exhibits one of the following four characteristics: (a) has feature "f" and belongs to the class "c" ($f^+c^+$); (b) has feature "f" but does not belong to class "c" ($f^+c^-$); (c) does not have feature sofa but belongs to class "c" ($f^-c^+$); or (d) does not have feature "f" and does not belong to class "c" ($f^-c^-$). If A is a number of messages objects exhibiting characteristic $f^+c^+$, B is a number of messages exhibiting characteristic $f^+c^-$, C is a number of messages exhibiting characteristic $f^-c^+$, D is a number of messages exhibiting characteristic $f^-c^-$, and m is a total number of messages in the training set, then mutual information may be expressed as a function of counts A, B, C and D for the training set, as given by equation (21) as follows:

$$MI = \frac{A}{m} \log \left( \frac{Am}{(A+C)(A+B)} \right) + \frac{B}{m} \log \left( \frac{Bm}{(A+B)(B+D)} \right) + \quad (21)$$
$$\frac{C}{m} \log \left( \frac{Cm}{(A+C)(C+D)} \right) + \frac{D}{m} \log \left( \frac{Dm}{(B+D)(C+D)} \right)$$

Once the mutual information is determined for each feature and for the entire training set, the top N features (where N is not critical but is illustratively 500), in terms of their corresponding quantitative mutual information ranked in descending order, are selected. A reduced N-by-m feature matrix, X, is then constructed which contains only these N features for each training set message. The remaining features are simply discarded. Once this reduced matrix is fully constructed, execution exits from matrix reduction process 540. Thereafter, execution proceeds to block 550 which specifies the selected N features to matrix/vector generator 350 such that only these features will be subsequently used to construct a feature vector for each incoming message subsequently being classified. Once this occurs, execution then proceeds to block 560. Through its execution, this block constructs classifier 370, illustratively here a modified SVM (as discussed above), with N features. This block then conventionally trains this classifier, in the manner set forth above, given the known classification of each of the m messages in the training set. Once classifier 370 is fully trained, execution exits from training process 500.

Figure 6B:
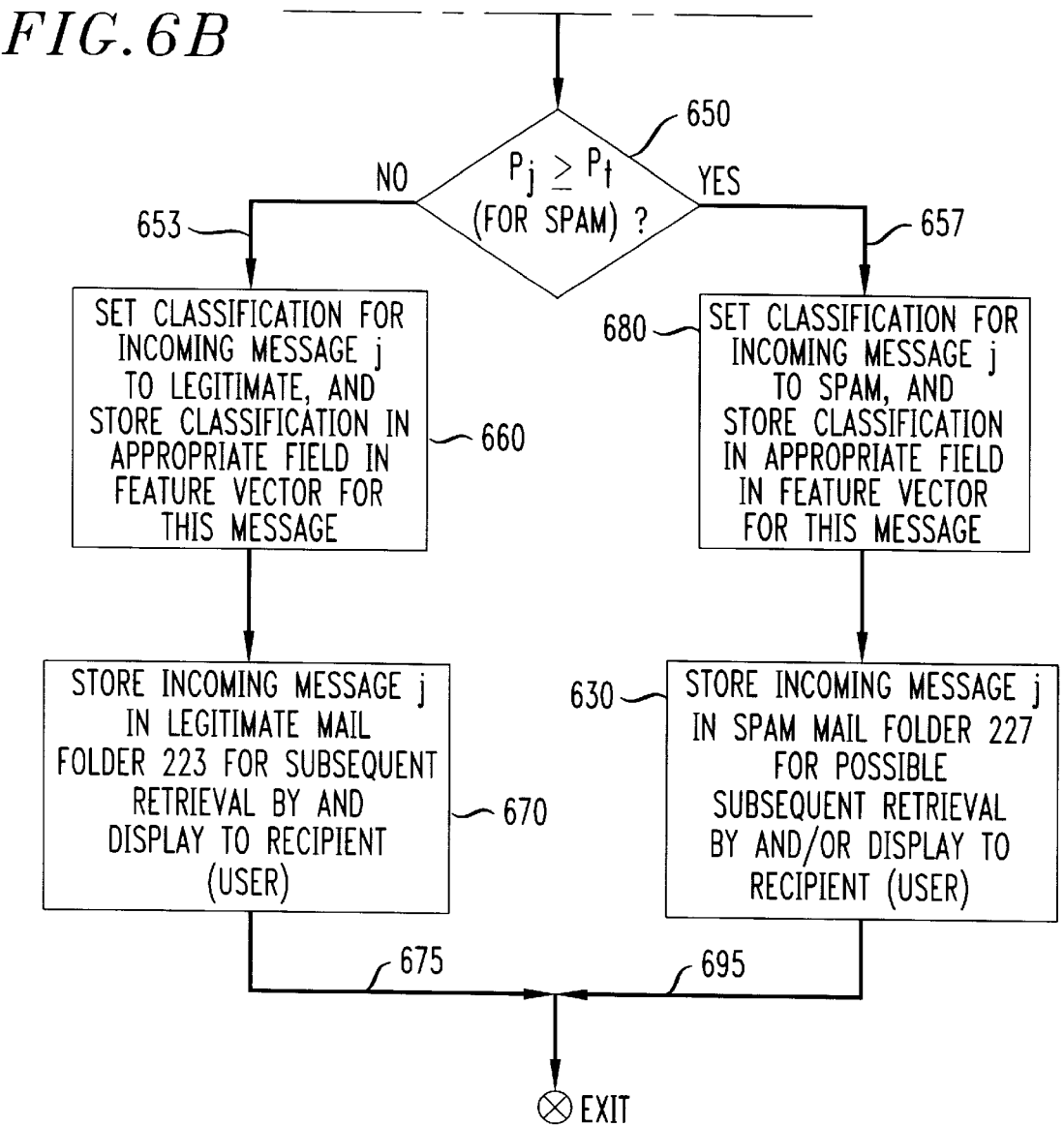
Figure 6:
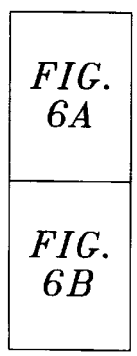
FIG. 6 depicts the correct alignment of the drawing sheets for FIGS. 6A and 6B.

FIGS. 6A and 6B collectively depict a high-level flowchart of Classification process 600 that also forms a portion of our inventive processing, as shown in FIG. 3A (the implementing software for this process, which forms a portion of inventive client e-mail program 130 shown in FIG. 2, is stored as executable instructions and, as appropriate, data in memory 430 shown in FIG. 4), and is executed by client computer 100 to classify an incoming e-mail message as either a legitimate message or spam. The correct alignment of the drawing sheets for FIGS. 6A and 6B is shown in FIG. 6.

As shown in FIGS. 6A and 6B, upon entry into process 600, execution first proceeds to block 610. This block, when executed, provides initial processing of each incoming message j. In particular, block 610 analyzes the text of this particular message through text analyzer 330 in order to break that message into its constituent tokens, as noted above, and also detects, through handcrafted feature detector 320, the presence of each predefined handcrafted feature in the message. Once this occurs, execution next proceeds to block 620. This block passes the word-based tokens for message j through word-oriented indexer 340 to detect the presence of each of the predefined simple-word-based (i.e., indexed) features, specified in feature definitions 323, in that message. At this point, message j is now characterized in terms of the n-element feature space. Once this occurs, execution then proceeds to block 630. This block constructs, through matrix/vector generator 350 and based on the particular N features that have specified during an immediately prior execution of Feature Selection and Training process 500 (as discussed above), an N-element feature vector for message j. Once this particular vector is established, execution proceeds to block 640. Through execution of block 640, the contents of this vector are applied as input to classifier 370 to yield a classification probability, $p_j$, (output confidence level) for message j.

Execution next proceeds to decision block 650, which effectively implements using, e.g., a sigmoid function as described above, threshold comparator 380. In particular, block 650 determines whether the classification probability of message j, i.e., $p_j$, is greater than or equal to the predefined threshold probability, $p_t$, (illustratively 0.999) for spam. If, for message j, its classification probability is less than the threshold probability, then this message is deemed to be legitimate. In this case, decision block 650 directs execution, via NO path 653, to block 660. This latter block, when executed, sets the classification for incoming message j to legitimate and stores this classification within an appropriate classification field in the feature vector for this message. Thereafter, execution proceeds to block 670 which stores message j within legitimate mail folder 223 for subsequent retrieval by and display to its recipient. Once this message is so stored, execution exits, via path 675 from process 600. Alternatively, if, for message j, its classification probability exceeds or equals the threshold probability, then this message is deemed to be spam. In this case, decision block 650 directs execution, via YES path 657, to block 680. This latter block, when executed, sets the classification for incoming message j to spam and stores this classification within an appropriate classification field in the feature vector for this message. Thereafter, execution proceeds to block 690 which stores message j within spam folder 227 for possible subsequent retrieval by and/or display to its recipient. Once message j is stored in this folder, execution then exits, via path 695 from process 600.

Though we have described our inventive message classifier as executing in a client computer, e.g., computer 100 shown in FIG. 1, and classifying incoming e-mail messages for that client, our inventive classifier can reside in a server, such as in, e.g., a mail server, and operate on all or a portion of an incoming mail stream such that classified messages can then be transferred from the server to a client. In this manner, client processing could be advantageously reduced. Moreover, our inventive classifier can be used to classify any electronic message, not just e-mail messages. In that regard, such messages can include, e.g., electronic postings to newsgroups or bulletin boards or to any other repository or mechanism from which these messages may be retrieved and/or disseminated.

Although various embodiments, each of which incorporates the teachings of the present invention, have been shown and described in detail herein, those skilled in the art can readily devise many other embodiments that still utilize these teachings.

We claim:

1. A method of classifying an incoming electronic message, as a function of content of the message, into one of a plurality of predefined classes, the method comprising the steps of:

determining whether each one of a pre-defined set of N features (where N is a predefined integer) is present in the incoming message so as to yield feature data associated with the message;

applying the feature data to a probabilistic classifier so as to yield an output confidence level for the incoming message which specifies a probability that the incoming message belongs to said one class, wherein the classifier has been trained, on past classifications of message content for a plurality of messages that form a training set and belong to said one class, to recognize said N features in the training set;

classifying, in response to a magnitude of the output confidence level, the incoming message as a member of said one class of messages;

automatically updating the training set to include classification of message content for an incoming message which has been classified by a user in another one of the predefined classes other than said one class specified by the classifier so as to form an updated training set; and automatically re-training the classifier based on the updated training set so as to adapt the operation of the classifier to changes in either message content that affect message classification or in user perceptions of the content of incoming messages.

2. The method in claim 1 wherein the classes comprise first and second classes for first and second predefined categories of messages, respectively.

3. The method in claim 2 wherein the classes comprise a plurality of sub-classes and said one class is one of said sub-classes.

4. The method in claim 2 further comprising the steps of:

comparing the output confidence level for the incoming message to a predefined probabilistic threshold value so as to yield a comparison result; and distinguishing said incoming message, in a predefined manner associated with the first class, from messages associated with the second class if the comparison result indicates that the output confidence level equals or exceeds the threshold level.

5. The method in claim 3 wherein the predefined manner comprises storing the first and second classes of messages in separate corresponding folders, or providing a predefined visual indication that said incoming message is a member of the first class.

6. The method in claim 5 wherein said indication is a predefined color coding of all or a portion of the incoming message.

7. The method in claim 6 wherein a color of said color coding varies with the confidence level that the incoming message is a member of the first class.

8. The method in claim 4 further comprising the steps of:

detecting whether each of a first group of predefined handcrafted features exists in the incoming message so as to yield first output data;

analyzing text in the incoming message so as to break the text into a plurality of constituent tokens;

ascertaining, using a word-oriented indexer and in response to said tokens, whether each of a second group of predefined word-oriented features exists in the incoming message so as to yield second output data, said first and second groups collectively defining an n-element feature space (where n is an integer greater than N);

forming, in response to the first and second output data, an N-element feature vector which specifies whether each of said N features exists in the incoming message; and applying the feature vector as input to the probabilistic classifier so as to yield the output confidence level for the incoming message.

9. The method in claim 8 wherein the feature space comprises both word-based and handcrafted features.

10. The method in claim 8 wherein the classes comprise a plurality of sub-classes and said one class is one of said sub-classes.

11. The method in claim 8 wherein the message is an electronic mail (e-mail) message and said first and second classes are non-legitimate and legitimate messages, respectively.

12. The method in claim 9 wherein the handcrafted features comprise features correspondingly related to formatting, authoring, delivery or communication attributes that characterize a message as belonging to the first class.

13. The method in claim 12 wherein the formatting attributes comprises whether a predefined word in the text of the incoming message is capitalized, or whether the text of the incoming message contains a series of predefined punctuation marks.

14. The method in claim 12 wherein the delivery attributes comprise whether the incoming message contains an address of a single recipient or addresses of plurality of recipients, or a time at which the incoming message was transmitted.

15. The method in claim 12 wherein the authoring attributes comprise whether the incoming message contains an address of a single recipient, or contains addresses of plurality of recipients or contains no sender at all, or a time at which the incoming message was transmitted.

16. The method in claim 12 wherein the communication attributes comprise whether the incoming message has an attachment, or whether the message was sent from a predefined domain type.

17. The method in claim 8 wherein the probabilistic classifier comprises a Naive Bayesian classifier, a limited dependence Bayesian classifier, a Bayesian network classifier, a decision tree, a support vector machine, or is implemented through use of content matching.

18. The method in claim 17 wherein:
the feature data applying step comprises the step of yielding the output confidence level for said incoming message through a support vector machine; and
the comparing step comprises the step of thresholding the output confidence level through a predefined sigmoid function to produce the comparison result for the incoming message.

19. The method in claim 4 further comprises a training phase having the steps of:
detecting whether each one of a plurality of predetermined features exists in each message of a training set of m messages belonging to the first class so as to yield a feature matrix containing feature data for all of the training messages, wherein the plurality of predetermined features defines a predefined n-element feature space and each of the training messages has been previously classified as belonging to the first class;
reducing the feature matrix in size to yield a reduced feature matrix having said N features (where n, N and m are integers with n>N); and
applying the reduced feature matrix and the known classifications of each of said training messages to the classifier and training the classifier to recognize the N features in the m-message training set.

20. The method in claim 19 wherein said indication is a predefined color coding of all or a portion of the incoming message.

21. The method in claim 20 wherein a color of said color coding varies with the confidence level that the incoming message is a member of the first class.

22. The method of claim 19 further comprising the step of utilizing messages in the first class as the training set.

23. The method in claim 19 wherein the reducing step comprises the steps of:
eliminating all features from the feature matrix, that occur less than a predefined amount in the training set, so as to yield a partially reduced feature matrix;
determining a mutual information measure for all remaining features in the partially reduced feature matrix;
selecting, from all the remaining features in the partially reduced matrix, the N features that have highest corresponding quantitative mutual information measures; and
forming the reduced feature matrix containing an associated data value for each of the N features and for each of the m training messages.

24. The method in claim 19 wherein the feature space comprises both word-oriented and handcrafted features.

25. The method in claim 19 wherein the classes comprise a plurality of sub-classes and said one class is one of said sub-classes.

26. The method in claim 24 wherein the message is an electronic mail (e-mail) message and said first and second classes are non-legitimate and legitimate messages, respectively.

27. The method in claim 26 wherein the handcrafted features comprise features correspondingly related to formatting, authoring, delivery or communication attributes that characterize an e-mail message as belonging to the first class.

28. The method in claim 27 wherein the formatting attributes comprises whether a predefined word in the text of the incoming message is capitalized, or whether the text of the incoming message contains a series of predefined punctuation marks.

29. The method in claim 27 wherein the delivery attributes comprise whether the incoming message contains an address of a single recipient or addresses of plurality of recipients, or a time at which the incoming message was transmitted.

30. The method in claim 27 wherein the authoring attributes comprise whether the incoming message contains an address of a single recipient, or contains addresses of plurality of recipients or contains no sender at all, or a time at which the incoming message was transmitted.

31. The method in claim 27 wherein the communication attributes comprise whether the incoming message has an attachment, or whether the message was sent from a predefined domain type.

32. The method in claim 8 further comprising the step of updating, from a remote server, the probabilistic classifier and definitions of features associated with the first class.

33. A computer readable medium having computer executable instructions stored therein for performing the steps of claim 1.

34. Apparatus for classifying an incoming electronic message, as a function of content of the message, into one of a plurality of predefined classes, the apparatus comprising:

a processor;

a memory having computer executable instructions stored therein;

wherein, in response to the stored instructions, the processor:

determines whether each one of a pre-defined se. of N features (where N is a predefined integer) is present in the incoming message so as to yield feature data associated with the message;

applies the feature data to a probabilistic classifier so as to yield an output confidence level for the incoming message which specifies a probability that the incoming message belongs to said one class, wherein the classifier has been trained, on past classifications of message content for a plurality of messages that form a training set and belong to said one class, to recognize said N features in the training set;

classifies, in response to a magnitude of the output confidence level, the incoming message as a member of said one class of messages;

automatically updates the training set to include classification of message content for an incoming message which has been classified by a user in another one of the predefined classes other than said one class specified by the classifier so as to form an updated training set; and automatically re-trains the classifier based on the updated training set so as to adapt the operation of the classifier to changes in either message content that affect message classification or in user perceptions of the content of incoming messages.

35. The apparatus in claim 34 wherein the classes comprise first and second classes for first and second predefined categories of messages, respectively.

36. The apparatus in claim 35 wherein the classes comprise a plurality of sub-classes and said one class is one of said sub-classes.

37. The apparatus in claim 35 wherein the processor, in response to the stored instructions:

compares the output confidence level for the incoming message to a predefined probabilistic threshold value so as to yield a comparison result; and distinguishes said incoming message, in a predefined manner associated with the first class, from messages associated with the second class if the comparison result indicates that the output confidence level equals or exceeds the threshold level.

38. The apparatus in claim 36 wherein the processor, in response to the stored instructions, implements the predefined manner by storing the first and second classes of messages in separate corresponding folders, or providing a predefined visual indication that said incoming message is a member of the first class.

39. The apparatus in claim 38 wherein said indication is a predefined color coding of all or a portion of the incoming message.

40. The apparatus in claim 39 wherein a color of said color coding varies with the confidence level that the incoming message is a member of the first class.

41. The apparatus in claim 37 wherein the processor, in response to the stored instructions:

detects whether each of a first group of predefined handcrafted features exists in the incoming message so as to yield first output data;

analyzes text in the incoming message so as to break the text into a plurality of constituent tokens;

ascertains, using a word-oriented indexer and in response to said tokens, whether each of a second group of predefined word-oriented features exists in the incoming message so as to yield second output data, said first and second groups collectively defining an n-element feature space (where n is an integer greater than N);

forms, in response to the first and second output data, an N-element feature vector which specifies whether each of said N features exists in the incoming message; and applies the feature vector as input to the probabilistic classifier so as to yield the output confidence level for the incoming message.

42. The apparatus in claim 41 wherein the feature space comprises both word-based and handcrafted features.

43. The apparatus in claim 41 wherein the classes comprise a plurality of sub-classes and said one class is one of said sub-classes.

44. The apparatus in claim 41 wherein the message is an electronic mail (e-mail) message and said first and second classes are non-legitimate and legitimate messages, respectively.

45. The apparatus in claim 42 wherein the handcrafted features comprise features correspondingly related to formatting, authoring, delivery or communication attributes that characterize a message as belonging to the first class.

46. The apparatus in claim 45 wherein the formatting attributes comprises whether a predefined word in the text of the incoming message is capitalized, or whether the text of the incoming message contains a series of predefined punctuation marks.

47. The apparatus in claim 45 wherein the delivery attributes comprise whether the incoming message contains an address of a single recipient or addresses of plurality of recipients, or a time at which the incoming message was transmitted.

48. The apparatus in claim 45 wherein the authoring attributes comprise whether the incoming message contains an address of a single recipient, or contains addresses of plurality of recipients or contains no sender at all, or a time at which the incoming message was transmitted.

49. The apparatus in claim 45 wherein the communication attributes comprise whether the incoming message has an attachment, or whether the message was sent from a predefined domain type.

50. The apparatus in claim 41 wherein the probabilistic classifier comprises a Naive Bayesian classifier, a limited dependence Bayesian classifier, a Bayesian network classifier, a decision tree, a support vector machine, or is implemented through use of content matching.

51. The apparatus in claim 50 wherein the processor, in response to the stored instructions:

yields the output confidence level for said incoming message through a support vector machine; and thresholds the output confidence level through a predefined sigmoid function to produce the comparison result for the incoming message.

52. The apparatus in claim 37 further comprises a training phase wherein the processor, in response to the stored instructions:

detects whether each one of a plurality of predetermined features exists in each message of a training set of m messages belonging to the first class so as to yield a feature matrix containing feature data for all of the training messages, wherein the plurality of predetermined features defines a predefined n-element feature space and each of the training messages has been previously classified as belonging to the first class;

reduces the feature matrix in size to yield a reduced feature matrix having said N features (where n, N and m are integers with n>N); and applies the reduced feature matrix and the known classifications of each of said training messages to the classifier and training the classifier to recognize the N features in the m-message training set.

53. The apparatus in claim 52 wherein said indication is a predefined color coding of all or a portion of the incoming message.

54. The apparatus in claim 53 wherein a color of said color coding varies with the confidence level that the incoming message is a member of the first class.

55. The apparatus of claim 52 further wherein the processor, in response to the stored instructions, utilizes messages in the first class as the training set.

56. The apparatus in claim 52 wherein the processor, in response to the stored instructions:

eliminates all features from the feature matrix, that occur less than a predefined amount in the training set, so as to yield a partially reduced feature matrix;

determines a mutual information measure for all remaining features in the partially reduced feature matrix;

selects, from all the remaining features in the partially reduced matrix, the N features that have highest corresponding quantitative mutual information measures; and forms the reduced feature matrix containing an associated data value for each of the N features and for each of the m training messages.

57. The apparatus in claim 52 wherein the feature space comprises both word-oriented and handcrafted features.

58. The apparatus in claim 52 wherein the classes comprise a plurality of sub-classes and said one class is one of said sub-classes.

59. The apparatus in claim 57 wherein the message is an electronic mail (e-mail) message and said first and second classes are non-legitimate and legitimate messages, respectively.

60. The apparatus in claim 59 wherein the handcrafted features comprise features correspondingly related to formatting, authoring, delivery or communication attributes that characterize an e-mail message as belonging to the first class.

61. The apparatus in claim 60 wherein the formatting attributes comprises whether a predefined word in the text of the incoming message is capitalized, or whether the text of the incoming message contains a series of predefined punctuation marks.

62. The apparatus in claim 60 wherein the delivery attributes comprise whether the incoming message contains an address of a single recipient or addresses of plurality of recipients, or a time at which the incoming message was transmitted.

63. The apparatus in claim 60 wherein the authoring attributes comprise whether the incoming message contains an address of a single recipient, or contains addresses of plurality of recipients or contains no sender at all, or a time at which the incoming message was transmitted.

64. The apparatus in claim 60 wherein the communication attributes comprise whether the incoming message has an attachment, or whether the message was sent from a predefined domain type.

65. The apparatus in claim 41 wherein the processor, in response to the stored instructions, updates, from a remote server, the probabilistic classifier and definitions of features associated with the first class.

* * * * *

UNITED STATES PATENT AND TRADEMARK OFFICE
CERTIFICATE OF CORRECTION

PATENT NO. : 6,161,130
DATED : December 12, 2000
INVENTOR(S) : Eric Horvitz, David E. Heckerman, Susan T. Dumais, Mehran Sahami and John C. Platt It is certified that error appears in the above-identified patent and that said Letters Patent is hereby corrected as shown below:

Title page,
Item [54], after "training" insert -- set --;

Column 4,
Line 18, change "many" to -- may --;

Column 12,
Line 49, change "x" to -- $x$ --;

Column 15,
Line 34, change "x" to -- $x$ --; and

Column 24,
Line 14, change "sofa" to -- "f" --.

Signed and Sealed this

Ninth Day of April, 2002

Attest:

JAMES E. ROGAN
Director of the United States Patent and Trademark Office

Attesting Officer

UNITED STATES PATENT AND TRADEMARK OFFICE
CERTIFICATE OF CORRECTION

PATENT NO.    : 6,161,130
DATED         : December 12, 2000
INVENTOR(S)   : Eric Horvitz et al.

It is certified that error appears in the above-identified patent and that said Letters Patent is hereby corrected as shown below:

Column 4,
Line 63, replace "such a" with -- such as --

Column 9,
Line 40, replace "span" with -- spam --

Column 29,
Line 6, replace "pre-defined se." with -- pre-defined set --

Signed and Sealed this

Thirty-first Day of August, 2004

JON W. DUDAS
*Director of the United States Patent and Trademark Office*